United States Patent [19]

Fosnough et al.

[11] 4,035,795
[45] July 12, 1977

[54] TOUCH KEYBOARD SYSTEM FOR DIGITAL LOGIC CONTROL

[75] Inventors: Robert D. Fosnough; David F. Bennett, both of Logansport, Ind.

[73] Assignee: Essex International, Inc., Fort Wayne, Ind.

[21] Appl. No.: 678,570

[22] Filed: Apr. 20, 1976

Related U.S. Application Data

[62] Division of Ser. No. 561,277, March 24, 1975, Pat. No. 4,011,428.

[51] Int. Cl.² .......................................... G08C 1/00
[52] U.S. Cl. ........................... 340/365 C; 307/141.4
[58] Field of Search ................................ 340/365 C

[56] References Cited

U.S. PATENT DOCUMENTS 3,886,539  5/1975  Gould ............................ 340/365 C

OTHER PUBLICATIONS

R. L. Donze, "Keyboard Encoder," IBM Tech. Bull., vol. 15, No. 4, pp. 1065, 1066, Sept. 1972.

*Primary Examiner*—Thomas B. Habecker
*Attorney, Agent, or Firm*—Lawrence E. Freiburger; Robert D. Sommer

[57] ABSTRACT

A control system for a microwave oven includes a programmable digital logic control circuit which enables a user to program information into the digital logic control circuit. The digital logic control circuit of the present invention allows a user to program information into the control, relating to the amount of time the magnetron tube is to be energized. The control also allows the user to select the power level or duty factor at which the magnetron is energized from three different levels, thus providing a choice to the user as to whether the magnetron is to be operated in a defrost mode, a slow cook mode or a cook mode. The control of the present invention allows the oven to be operated in a single stage manner whereby the microwave oven is operated in the defrost, slow cook or cook modes for the amount of time programmed into the control by the user. Alternatively, the oven may be programmed in a two stage manner whereby the user determines the duration of the defrost portion and the duration of the cook portion in a combination defrost-hold-cook mode. The user may also program the oven so that it operates in a combination defrost-hold-slow cook mode. A time of day clock and a timer is also provided by the control of the present invention. The user programs information into the control by means of a touch plate which is sectioned off into a plurality of areas, each area representing certain information to be entered into the control. Information in the control such as the time of day, the time remaining in any of the microwave modes, the time remaining in the timer mode, or the information which has been entered by the user is displayed to provide a visual feedback to the user.

2 Claims, 30 Drawing Figures

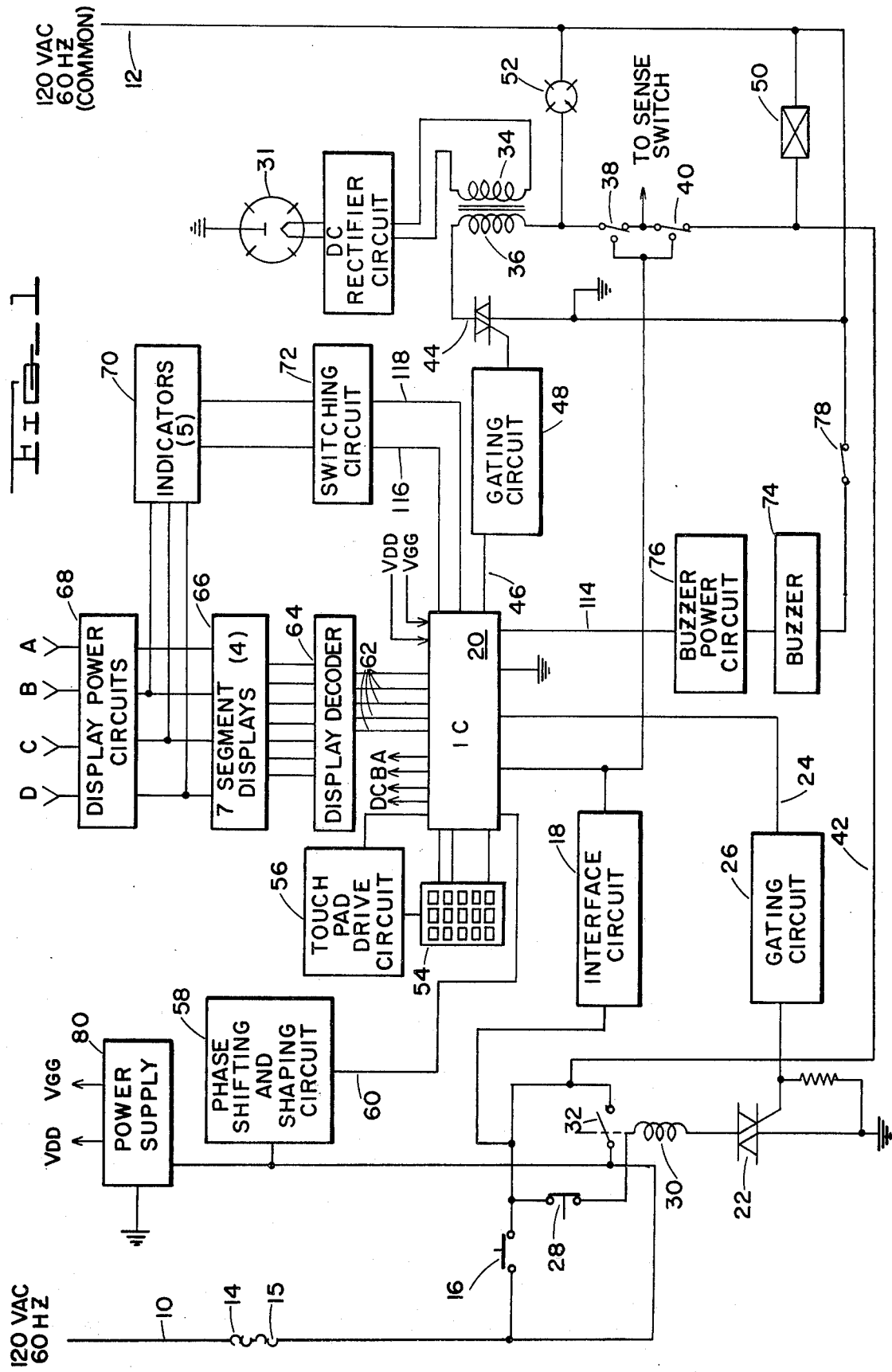

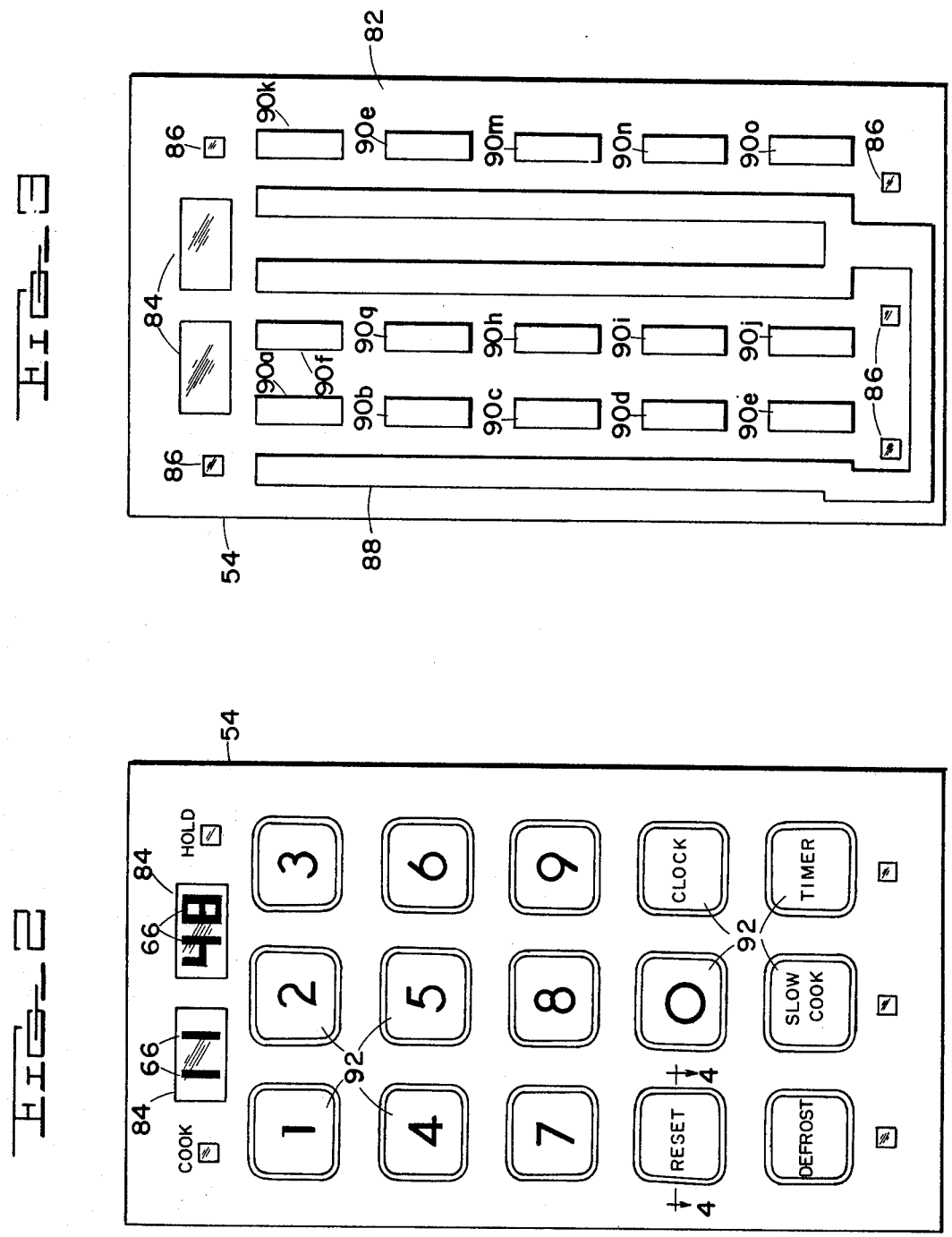

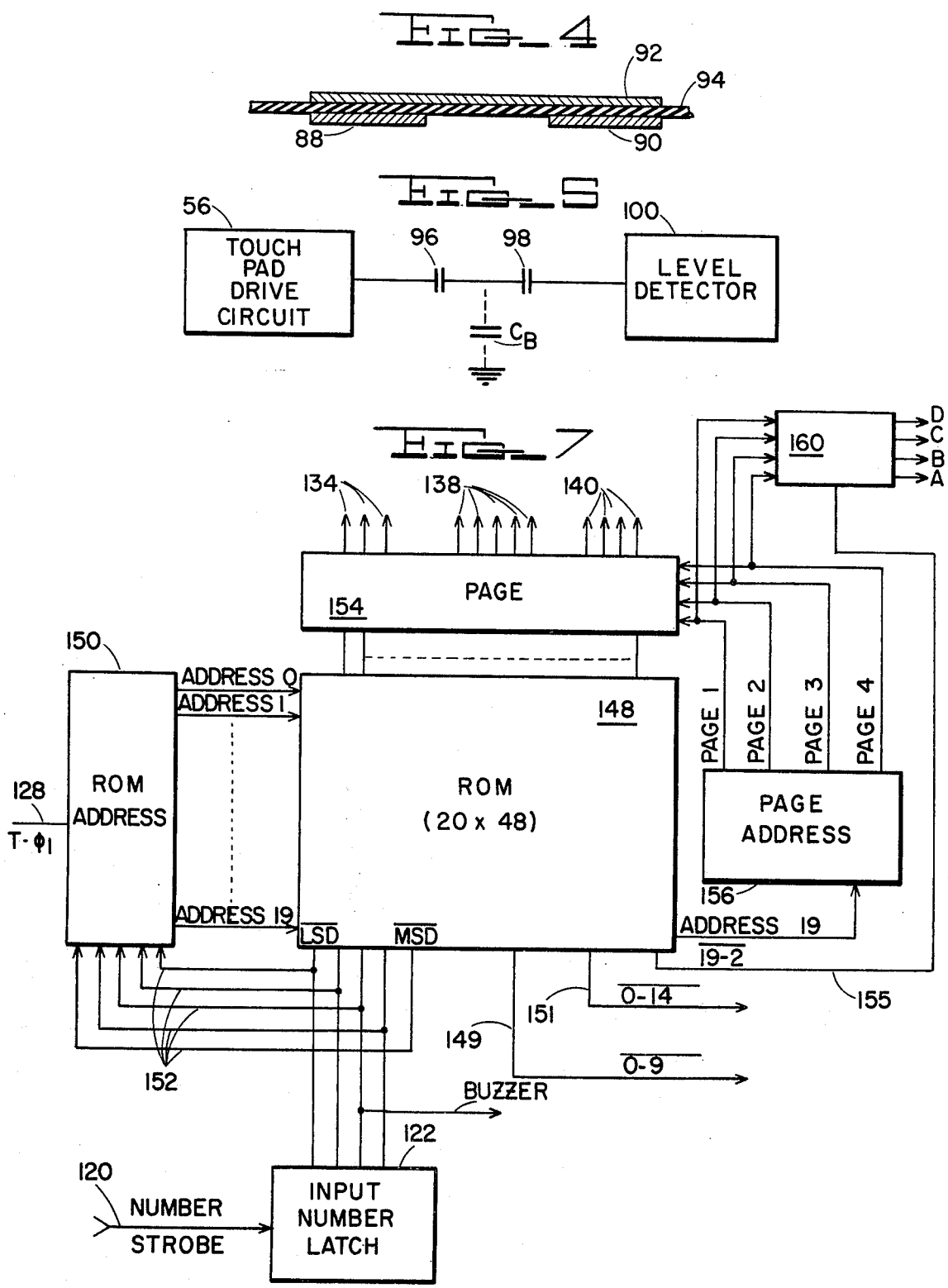

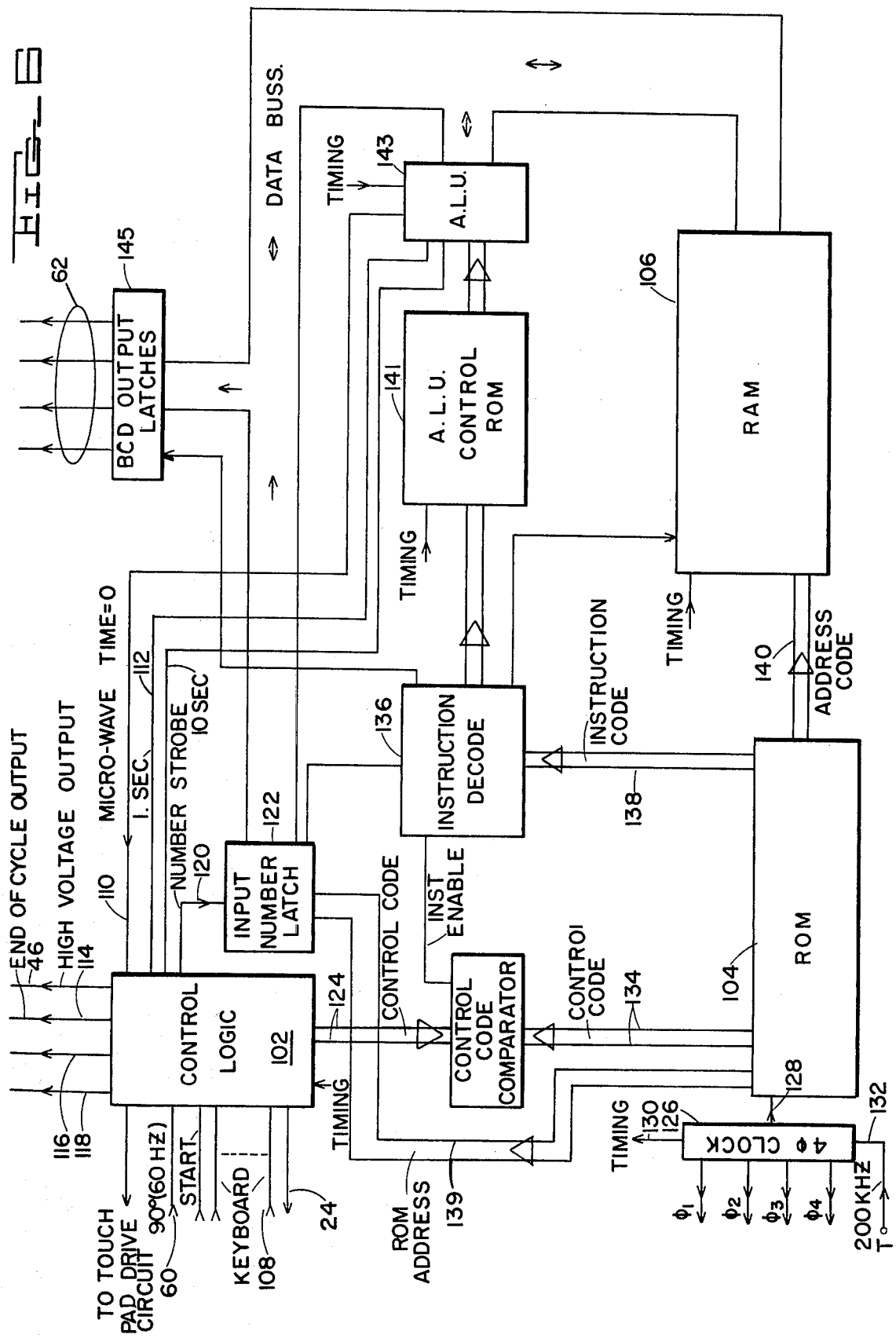

FIG_8
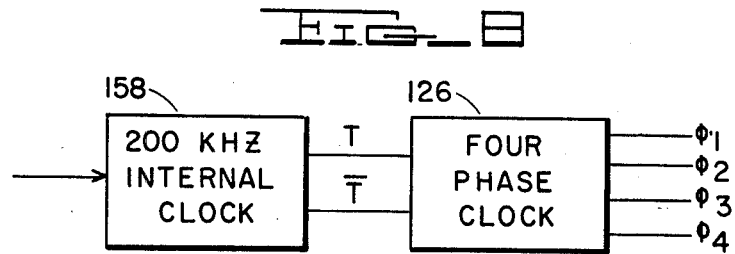
FIG_8A
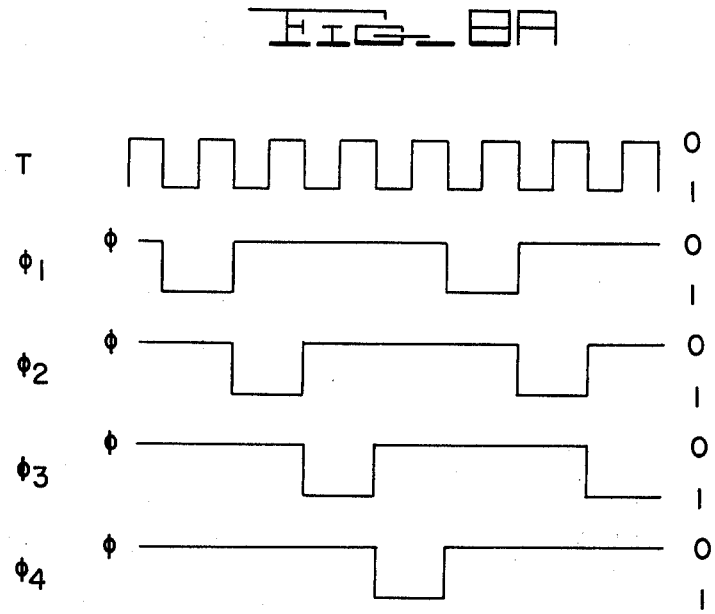

FIG. 10C

|  | 0 | 4 | 12 | 8 |
|---|---|---|---|---|
| 60 HZ | 1/60 SEC | 1/6 SEC | 1 SEC | 10 SEC |
|  | 2 | 6 | 14 | 10 |
| TIME OF DAY | 1 MIN | 10 MIN | 1 HR | 10 HR |
|  | 3 | 7 | 15 | 11 |
| $\mu\lambda$ TIMER | 1 SEC | 10 SEC | 1 MIN | 10 MIN |
|  | 1 | 5 | 13 | 9 |
| KEYBOARD | LSD | 2LSD | 2MSD | MSD |

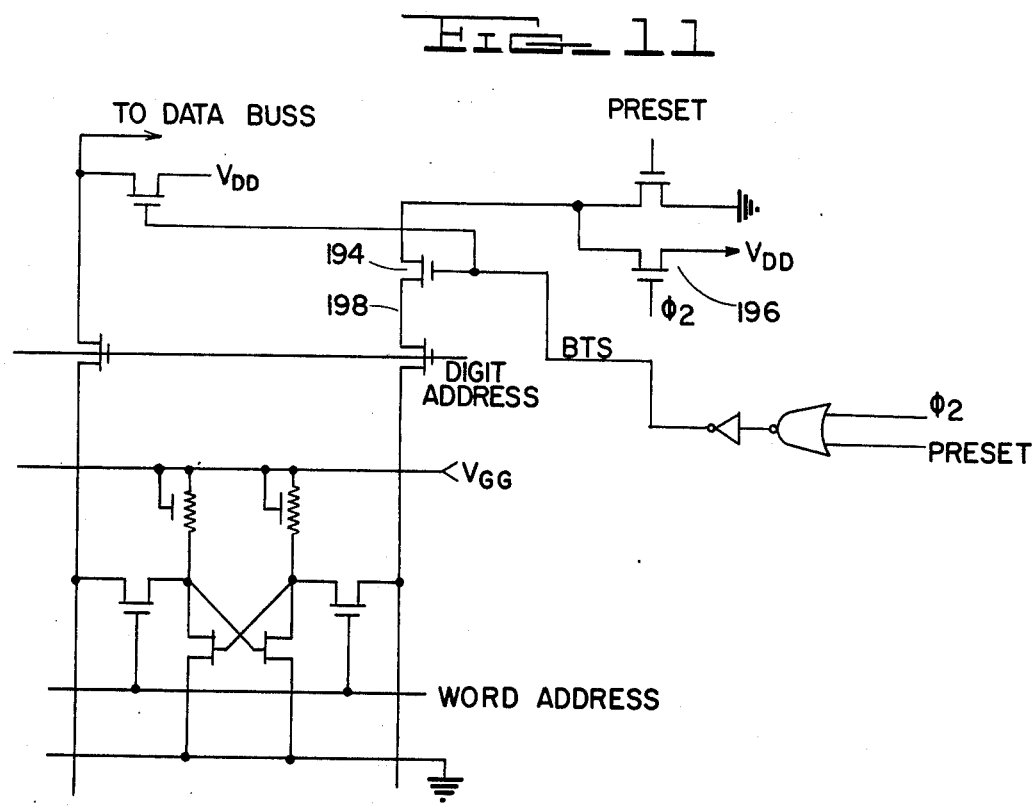

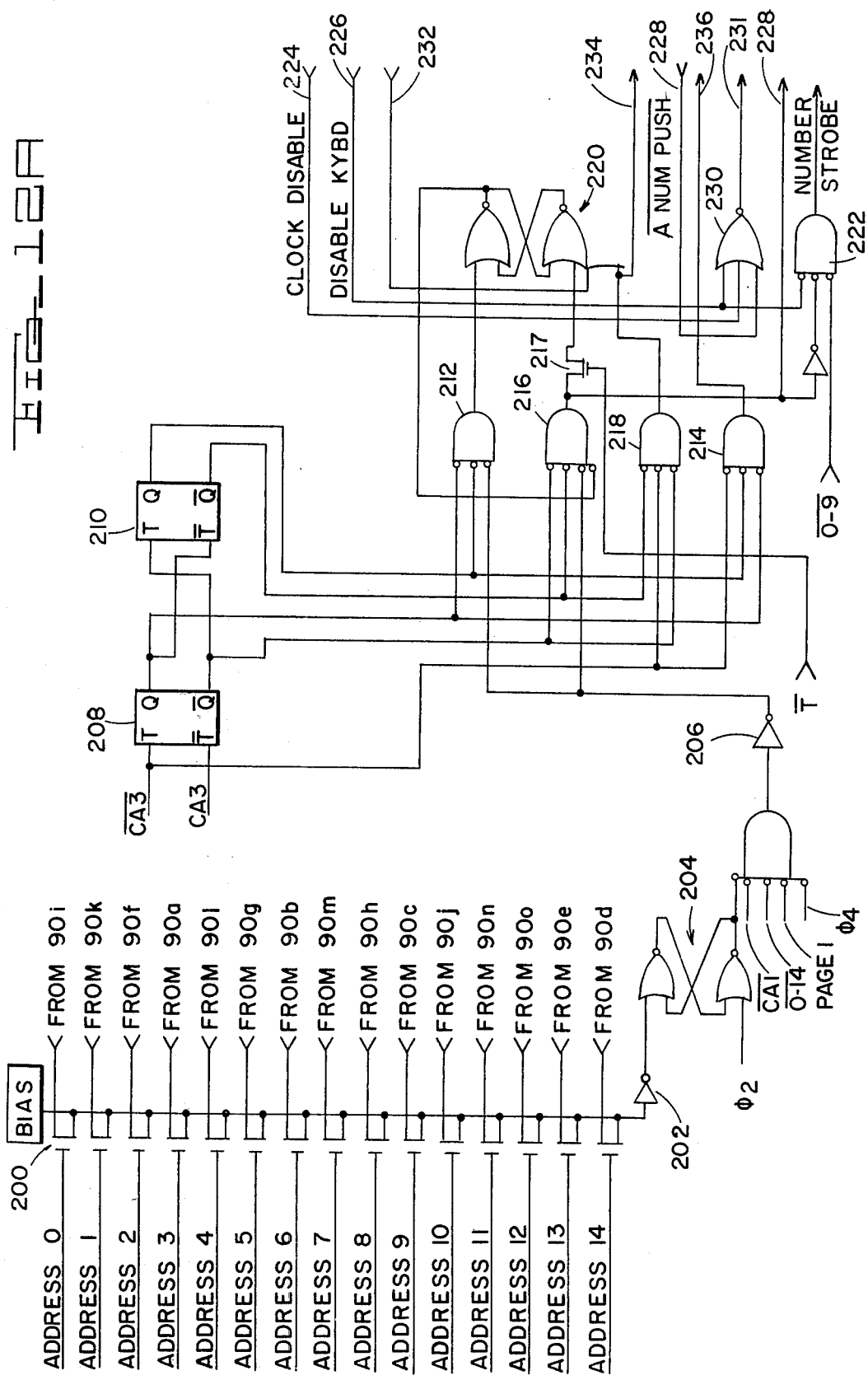

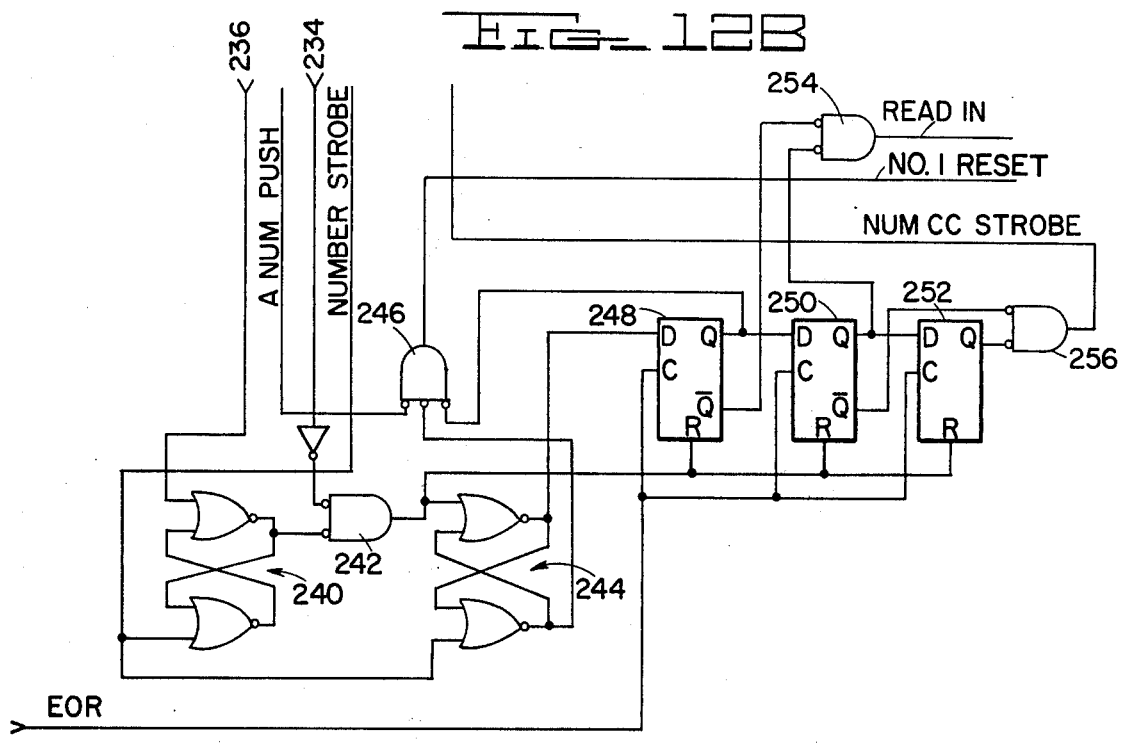

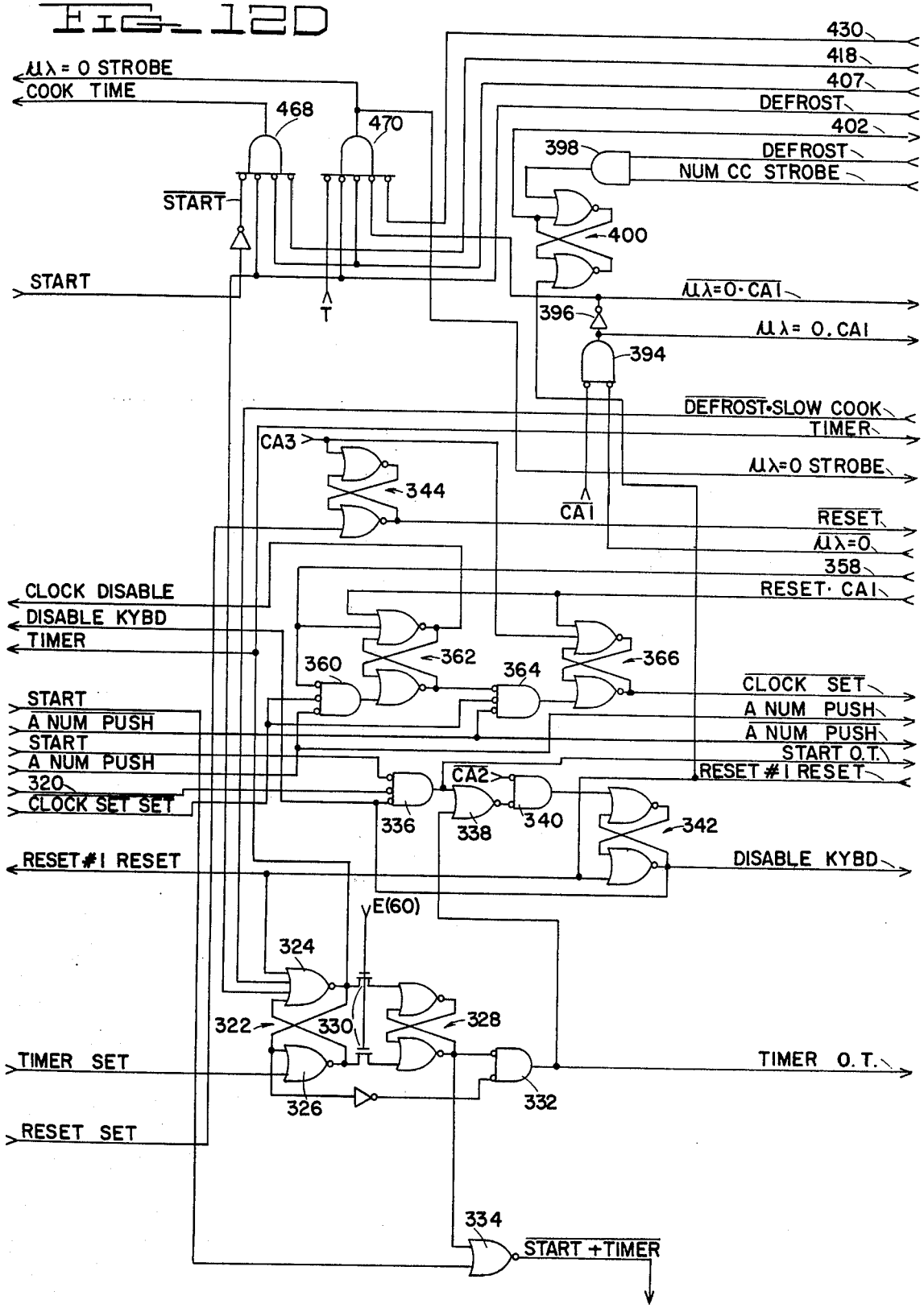

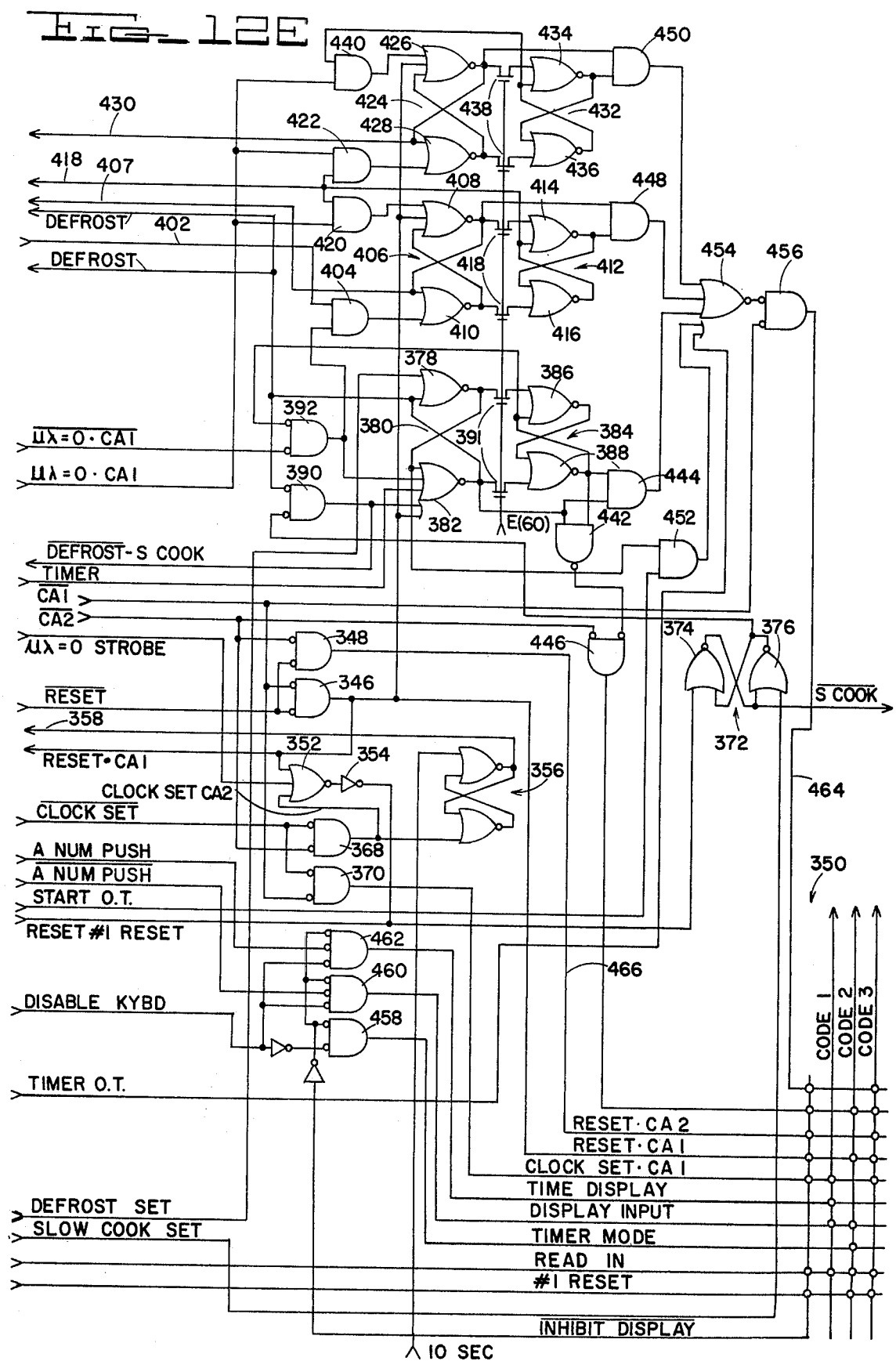

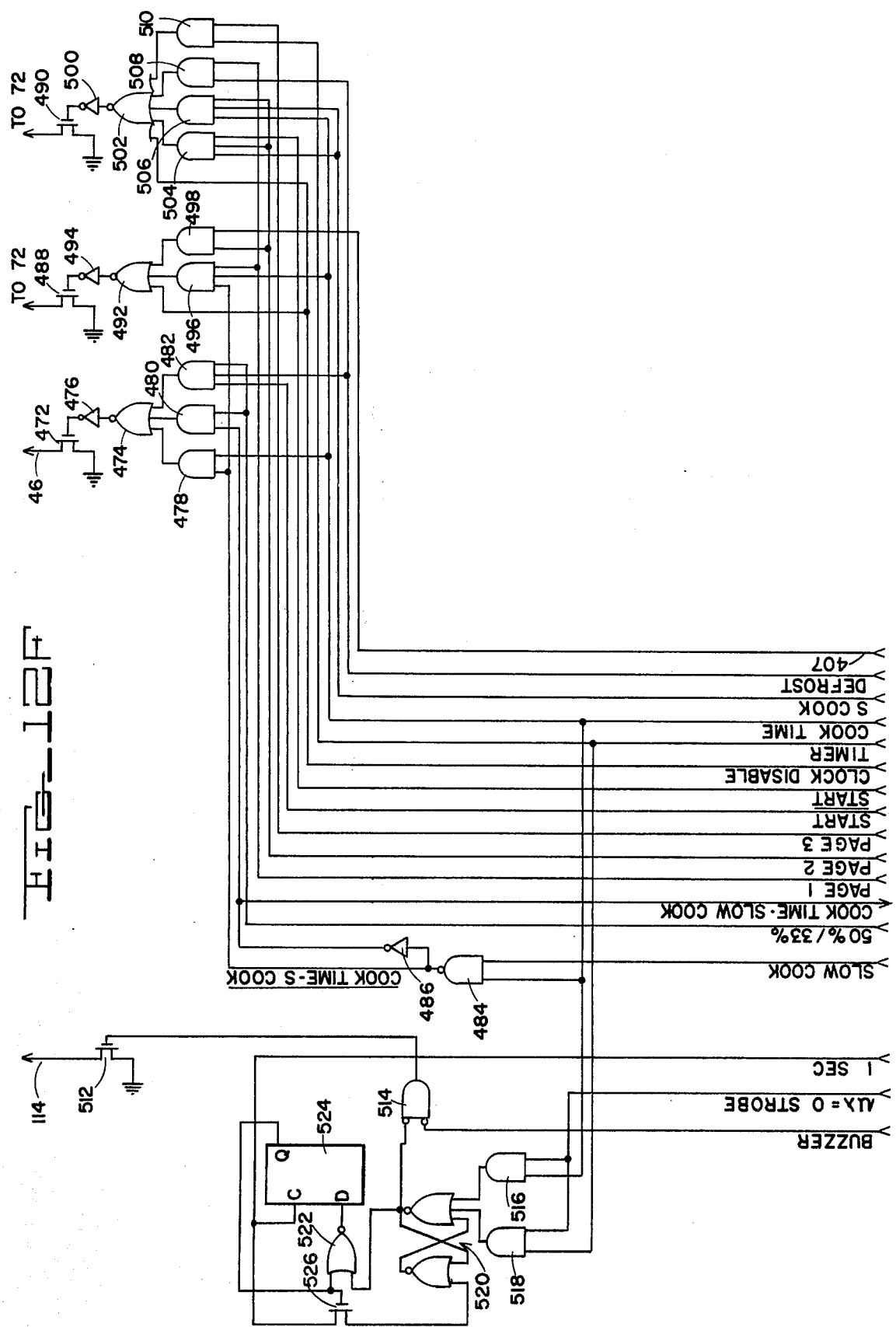

FIG_13
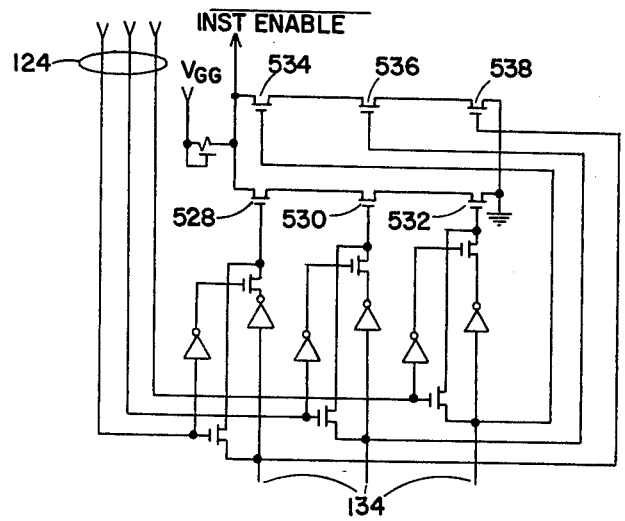
FIG_14C
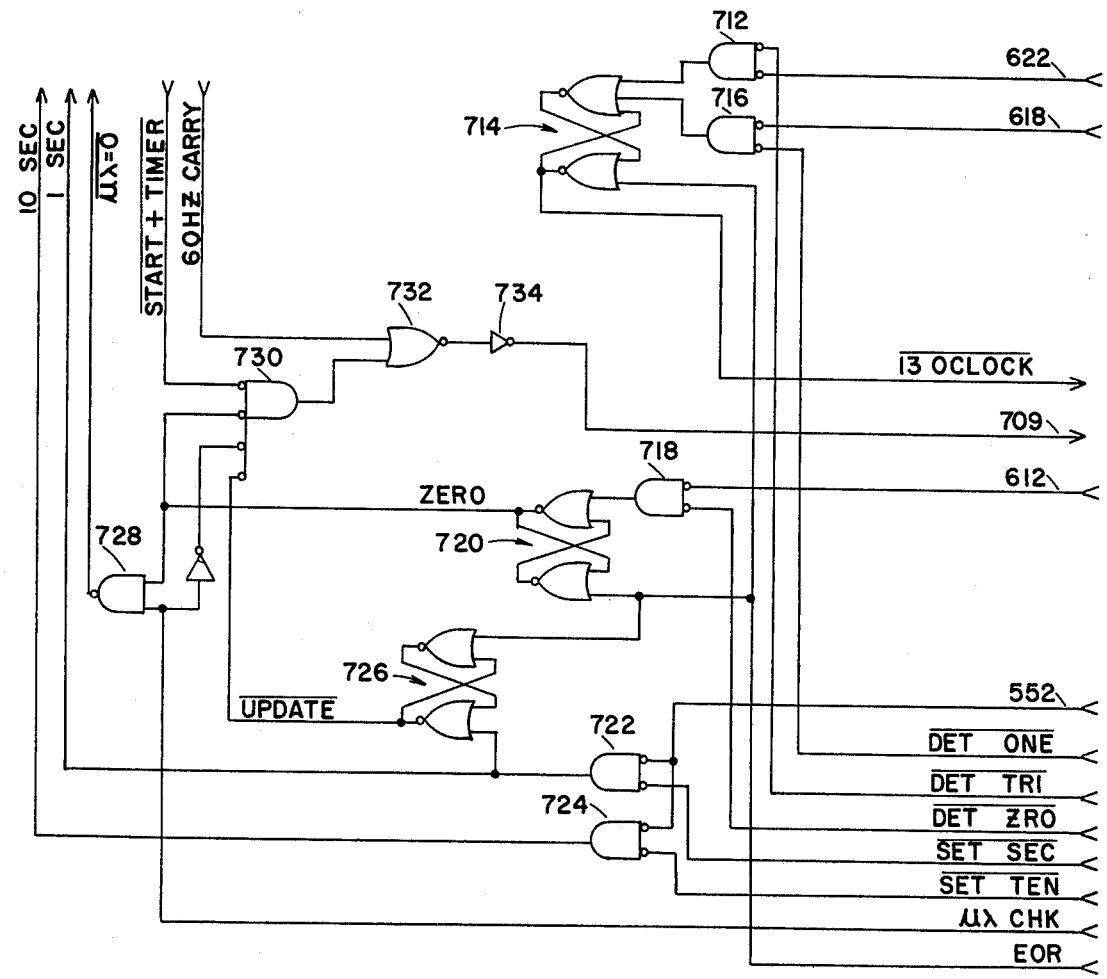

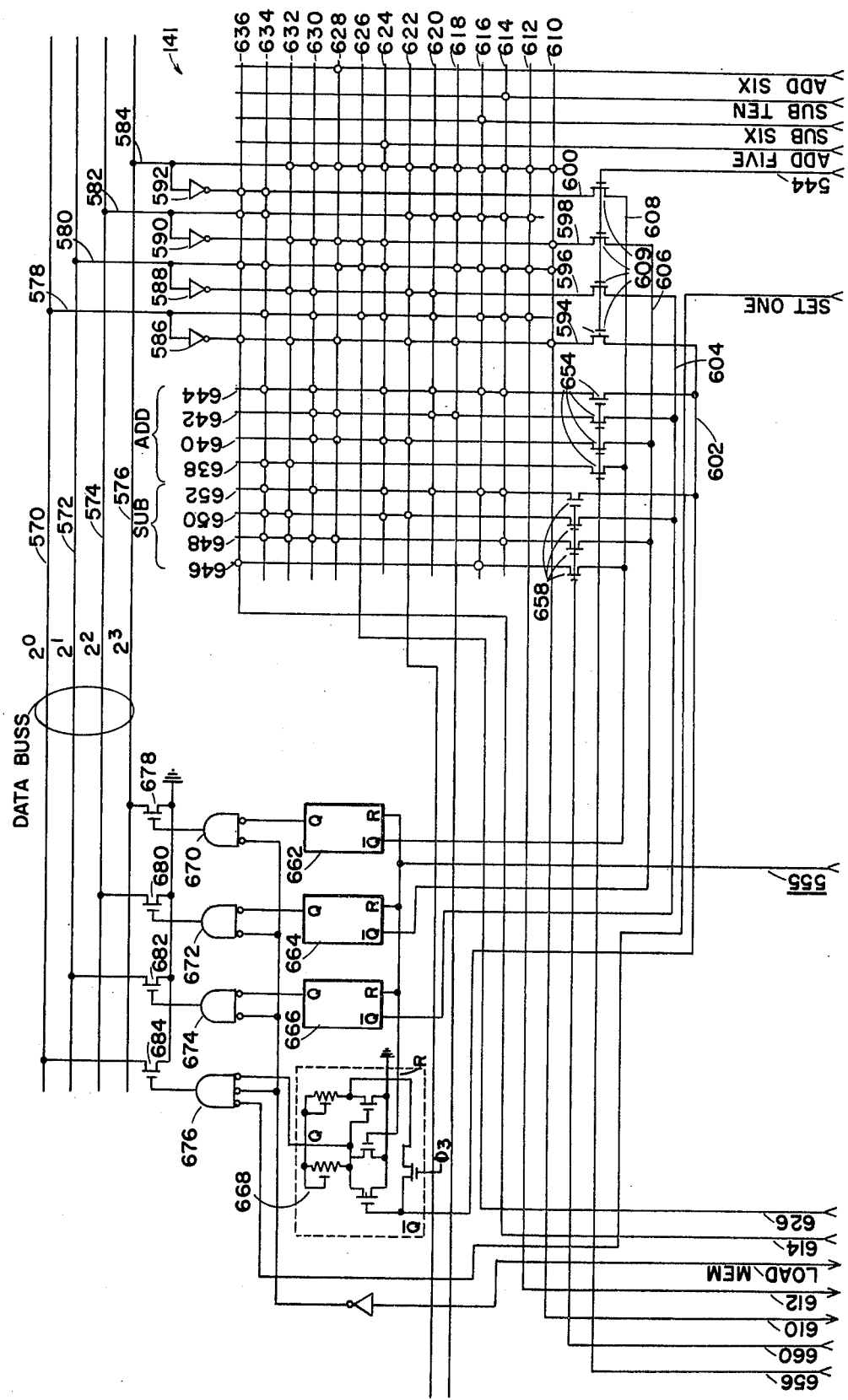
FIG_14A

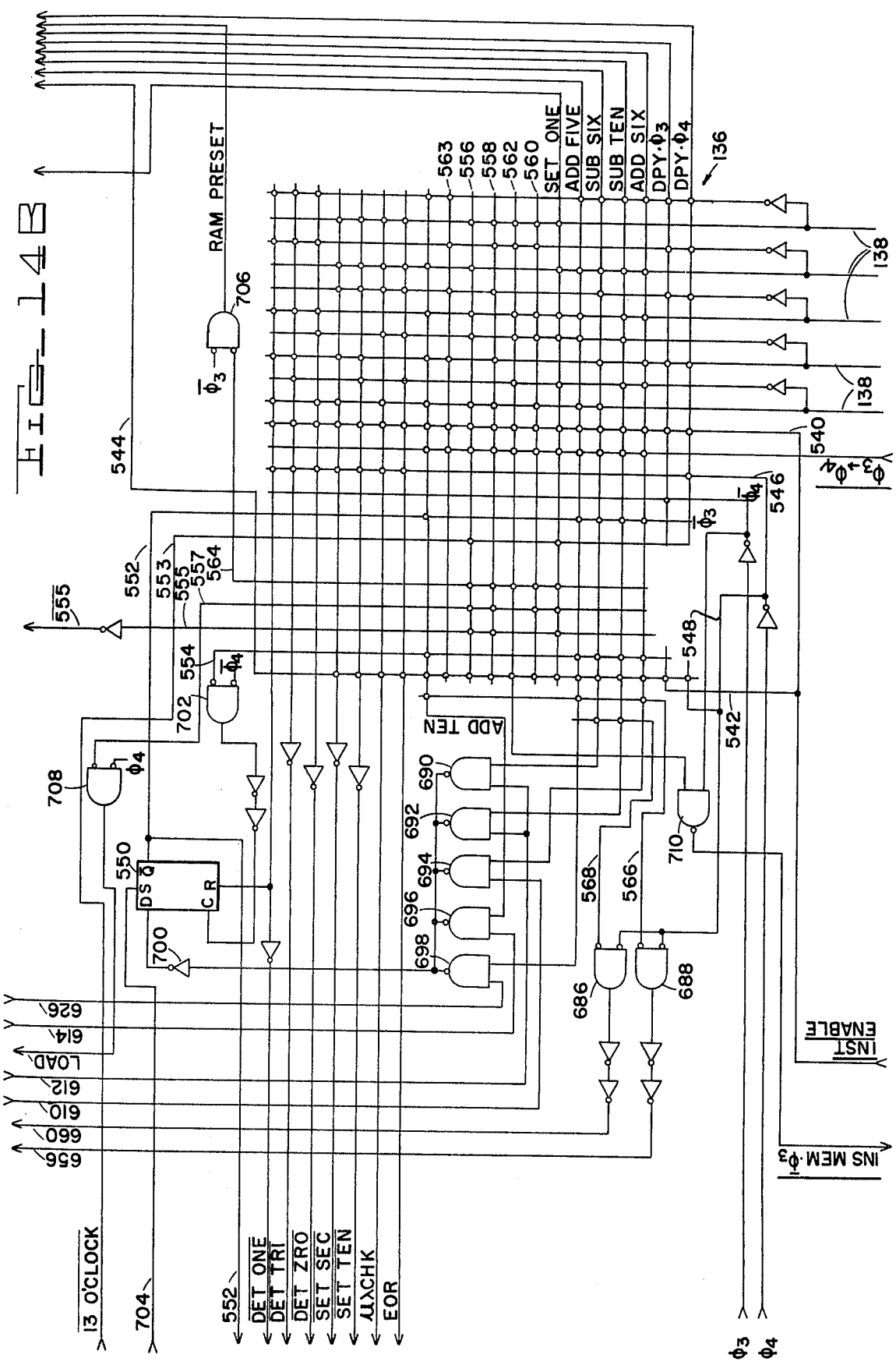
FIG_14B

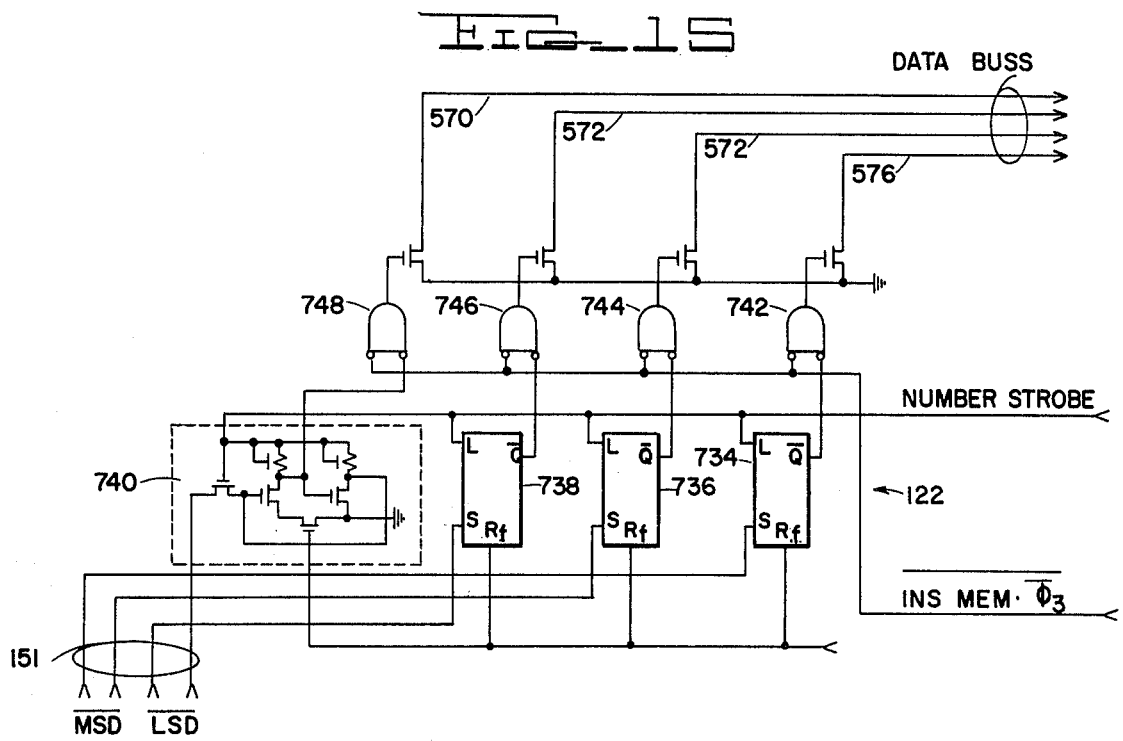
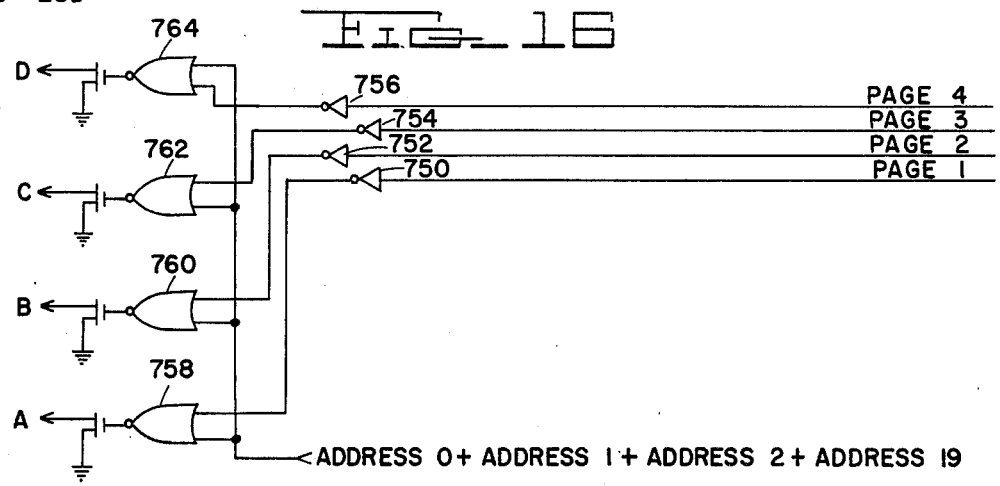
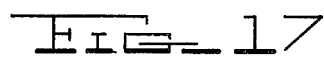
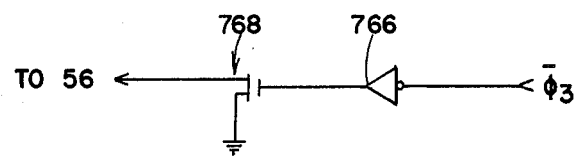

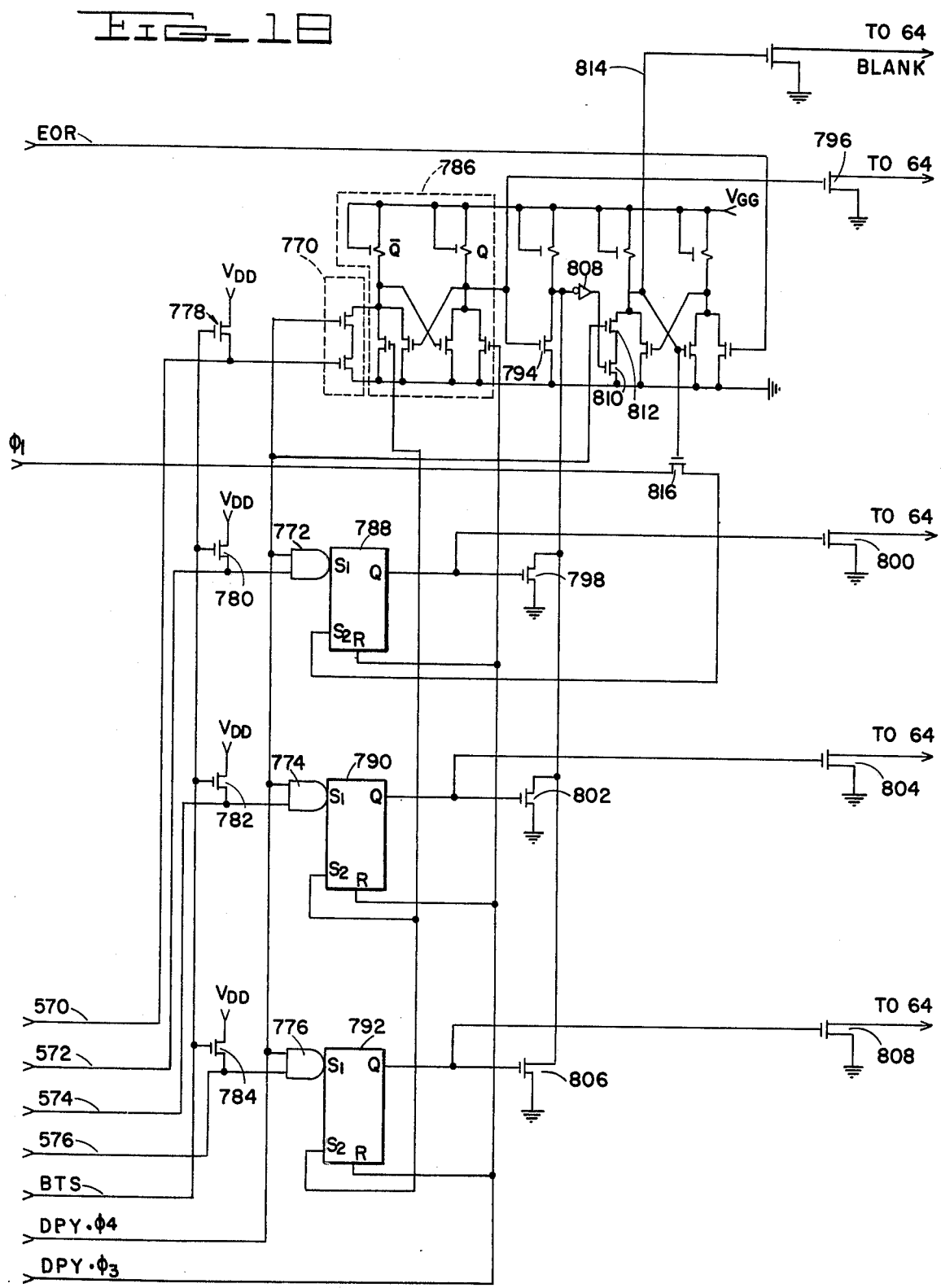

TOUCH KEYBOARD SYSTEM FOR DIGITAL LOGIC CONTROL

This is a division of application Ser. No. 561,277, filed Mar. 24, 1975, now U.S. Pat. No. 4,011,428 issued Mar. 8, 1977.

BACKGROUND OF THE INVENTION

Prior art microwave ovens have generally included a mechanical timer in the form of a presettable timer which is rotated to the proper position by the user to set the over timer so that it measures the proper interval. Although satisfactory in many respects, the mechanical timers have a number of drawbacks. For instance, mechanical timers for microwave ovens are required to be highly accurate and as a result are costly. In fact, some microwave ovens have used two mechanical timers, one for relatively short time intervals and the other for relatively long time intervals, in order to ensure the accuracy needed to time a microwave oven cooking interval. Other microwave ovens have included a push button actuated timing unit in which there are a plurality of push buttons, each representing a specific time interval. With this type of timer, the user cannot select certain time intervals because each push button usually represents a time interval which is five or ten seconds greater than the next shorter time interval.

It has been known in the past to provide an appliance with a digital logic control system. An example of such a system is shown in U.S. Pat. No. 3,819,906, which discloses a digital logic control system for an electric range. This control system not only provides a timing function for the oven and surface heating elements but also provides a time of day clock and a timer as well. Normally, the time of day is displayed on a display which also displays the information stored in the digital logic control. Although this system is satisfactory in many respects, the amount of digital logic required to implement this system is cumbersome and requires a large amount of area on an integrated circuit, and thus is relatively expensive. In addition, this control system does not allow two stage programmability where the same operating element is cycled through two stages of operation, the duration of each stage being determined by the user.

SUMMARY OF THE INVENTION

It is an object of the present invention to provide a digital logic control for an appliance, and particularly for a microwave oven, which allows the user to program information into the control relating to two stage operation. An additional object of the present invention is to provide a digital logic control for an appliance which allows the user to program the control for single stage or two stage operation. Other objects and features of the present invention will become apparent to those skilled in the art from the detailed description of the present invention.

Briefly speaking, the objectionable features of the prior art devices are overcome by the present invention which provides a digital logic control for a microwave oven. The digital logic control of the present invention provides a time of day clock, which is displayed on a display, a timer function for the microwave energy source which allows a user to select the duration of the interval during which the microwave energy source is energized, and a timer function which times an interval, the duration of which is predetermined by the user. Information is entered into the control of the present invention, by means of a touch plate which is sectioned off into a plurality of areas each of which represents certain information to be entered into the control. Certain information stored in a control system in accordance with the present invention is displayed on a four digit display unit which provides visual feedback to the user.

A digital logic control in accordance with the present invention provides a highly accurate timer which is necessary for use with a microwave oven. With the control of the present invention, the microwave oven may be operated in a cook mode where the magnetron is energized at full power for the entire user selected duration, or a slow-cook mode where the magnetron is energized at a first duty factor for the entire user selected duration, or a defrost mode where the magnetron is energized at a second duty factor for the entire user selected duration. The present invention also allows the magnetron to be cycled from the defrost mode into the cook or slow cook mode with a "hold" period in between. It has been found that the hold period between the defrost and the cook or slow cook mode allows the article to reach a uniform temperature throughout so that the article cooks uniformly when the magnetron enters into the cook or slow cook modes.

The digital logic control of the present invention accomplishes the objects of the present invention by providing an integrated circuit which has three main sections: a control logic section, a read only memory (R.O.M.) section, and a random access memory (R.A.M.) section. These three sections work together to take inputs from the touch plate keyboard and control the output displays and the high voltage output to the magnetron of a microwave oven.

Generally speaking, the control logic section ascertains when a particular area on the touch plate has been touched and the R.O.M. sees to it that instructions corresponding to that area are carried out. The R.A.M. has a plurality of words stored therein, representing the keyboard number, microwave cook time, the time of day, and a 60 HZ count for seconds and minutes. Some of the R.O.M. instructions see to it that the information in the R.A.M. is updated so as to provide the correct information at any particular instant.

BRIEF DESCRIPTION OF THE DRAWINGS

The present invention will be described in more detail hereinbelow and will be described in conjunction with the drawing figures, in which:

FIG. 1 is a block diagram view of the entire microwave oven control system in accordance with the present invention;

FIGS. 2 and 3 are elevational views of the front and back, respectively, of the touch panel of the present invention;

FIG. 4 is a sectional view taken along line 4—4 of FIG. 2;

FIG. 5 is a schematic representation of one of the touch switches for use with the present invention;

FIG. 6 is a block diagram of the digital logic circuitry of the present invention;

FIG. 7 is a schematic diagram of the ROM 104 and associated circuitry;

FIG. 8 is a schematic representation of the clock system of the present invention;

FIG. 8A is timing diagram of the clock signal T and the four phases $\phi$, $\phi_2$, $\phi_3$, and $\phi_4$ of the four phase clock in FIG. 8;

FIG. 10C is a schematic representation of the arrangement of the information stored in the RAM;

FIG. 11 is a schematic representation of a typical RAM cell;

FIGS. 12A-12F are logic schematics of the CONTROL LOGIC section;

FIG. 13 is a schematic of the CONTROL CODE COMPARATOR:

FIGS. 14A-14C are schematic representations of the INSTRUCTION DECODE LOGIC section, the ARITHMETIC CONTROL ROM, and the ARITHMETIC LOGIC UNIT;

FIG. 15 is a schematic representation of the INPUT DATA LATCH;

FIG. 16 is a logic schematic of the circuitry which produces the display multiplex signals;

FIG. 17 is a schematic of the circuitry which produces the signal for driving the TOUCH PAD DRIVE circuit; and FIG. 18 is a schematic of the BCD OUTPUT LATCH and associated circuitry.

DETAILED DESCRIPTION OF THE PREFERRED EMBODIMENT

DESCRIPTION OF THE OVERALL SYSTEM

Figure 9:
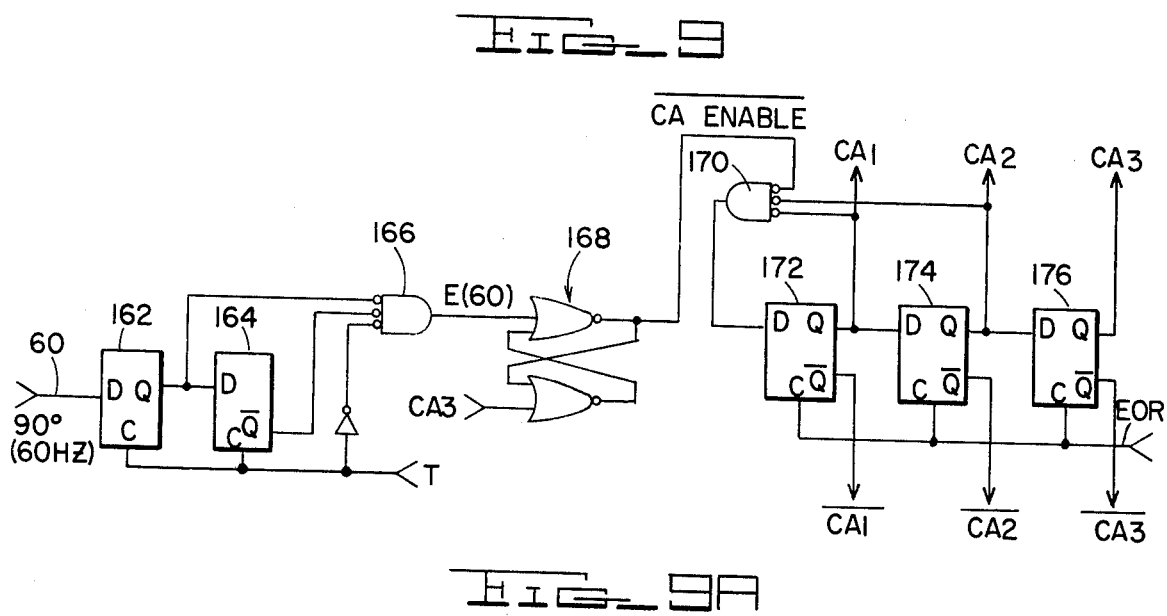
FIG. 9 is a circuit schematic of a portion of the integrated circuit.

Referring now to FIG. 1, there is disclosed a microwave oven control system in accordance with the present invention. The system is adapted to be connected to a source of conventional line voltage via power lines 10 and 12. Located in series with power line 10 are normally closed thermal switches 14 and 15 which are adapted to open if the magnetron tube temperature or the oven cavity temperature becomes too high. A normally open push button switch 16, when depressed, connects power line 10 to an interface circuit 18 which supplies a start signal to an integrated circuit 20. The integrated circuit 20, after a start signal has been received, supplies a gating signal to the gate of the triac 22 via line 24 and a gating circuit 26. It can be seen that a series connection from line 10 to line 12 will be traced through depressed start switch 16, a normally closed stop switch 28, a relay coil 30, and through triac 22, if gated to ground, which is line 12. Relay coil 30, when energized, attracts a holding contact 32 to the closed position, and it can be seen that, once energized, realy coil 30 will remain energized through contact 32, normally closed stop switch 28, and conductive triac 22.

A conventional magnetron tube 31 is connected in circuit with a DC Rectifier Circuit and the secondary winding 34 of a high voltage transformer, as is well known in the prior art. The primary winding 36 of the high voltage transformer is connected in a series circuit which includes a double throw latch switch 38 (shown in the latch closed position), a double throw interlock switch 40 (shown in the door closed position) which is eventually connected to power line 10 via line 42 and contact 32 or switch 16, if closed. It can be seen that triac 44 which is gated by a signal from the IC 20 on line 46 to a gating circuit 48, is located in series with the primary winding 36 such that the primary winding will be connected across power lines 10 and 12 whenever triac 44 is conductive, latch switch 38 is in the latch closed position, door interlock switch 40 is in the door closed position, either contact 32 or switch 16 are closed nd thermal switches 14 and 15 are closed. It can be seen further that a latch slenoid 50 which holds the door latch in a closed position will effectively be connected across power lins 10 and 12 whenever either start switch 16 or contact 32 is closed and stop switch 28 is closed. In the same manner, a fan motor 52 which cools the magnetron tube and associated circuitry will be energized as soon as the oven door is closed and latched, moving switches 38 and 40 to their position shown in FIG. 1. The interlock circuitry may also include a sense switch circuit (not shown) to detect the malfunction of the switch 38 or 40 and to open one of the power lines 10 or 12 when such a malfunction is detected.

Information is programmed into the IC by means of a touch panel 54, described in more detail below, which has a plurality of user touchable areas thereon, ech area representing certain information to be relayed to the IC 20. The touch panel is driven by a touch pad drive circuit 56 which is controlled by the IC 20.

A phase shifting and shaping circuit 58 is connected to power line 10 and provides a 60 HZ signal on line 60 to the IC which has a definite phase relationship to the 60 HZ input line voltage. This 60 HZ signal is then used by the IC to turn on the gating signal to gating circuit 48, and thus the triac 44, at a particular phase angle of the input line voltage. It has been found desirable to do this because voltage and current transients in the primary winding 36 of the high voltage transmformer may be minimized if the triac 44 becomes conductive at the proper phase angle of the input voltage.

Information from the IC is provided in the form of a four bit binary word on lines 62 to a conventional display decoder 64 which then decodes the binary word and supplies it in decoded form to four 7 segment displays indicated by reference numeral 66. The displays are driven by display power circuits 68 which are controlled by four multiplexing signals A, B, C and D as is conventional in the display art. Thus, at any particular time, only one of the four seven segment displays will be energized to display the particular binary word on lines 62 at that time.

The system also provides an additional visual output in the form of five indicator lights 70 which may be light emitting diodes and which are energized by a switching circuit 72 and the display power circuits 68. The indicators 70 are used to indicate which particular mode the control system is operating at a given time. The control system of the present invention also provides for an audible output in the form of a buzzer which is actuated by a buzzer power circuity 76 controlled by the IC. If the buzzer is annoying or is not desired, a defeat switch 78 may be opened to prevent the buzzer from being energized.

A power supply connected to line 10 and line 12 through ground is provided to supply power to the various circuitry of the control system. It will be readily understood that most of the circuits represented in FIG. 1 by block contain active elements which require an external source of power such as power supply circuit 80. Connections have not been indicated between the power supply circuit 80 and the other circuits in order not to complicate the diagram of the system shown in FIG. 1.

TOUCH PANEL AND ASSOCIATED CIRCUITRY

Referring now to FIG. 2 there is shown the front face of a touch panel for use with the present invention. Since the touch panel forms a dielectric for a plurality of capacitances it must be made of suitable dielectric material. Applicant has found that a suitable material is glass. The front of the panel 54 may have a plurality of spaced apart condutive coatings 92 thereon representing the arabic numerals 0 through 9. An additional plurality of spaced apart conductive coatings 92 may be located on the front of the panel 54 which represent, respectively, the following functions of the control: a reset function, a clock set function, a defrost function, a low power or slow cook function, and a timer function.

The rear of the touch panel may be coated with a first electrically nonconductive coating indicated by reference numeral 82 with a plurality of windows being provided therein. The seven segment displays 66 may be mounted behind the touch panel 54 such that they are able to be seen through windows 84 in coating 82. In the same manner, indicators 70 may be mounted behind the touch panel such that they are able to be seen through the windows designated 86 in coating 82. The rear of the touch panel may have a first conductive coating 88 thereon which consists essentially of three parallel traces electrically connected together at the bottom, and which are to be connected to the touch pad drive circuit 56. The rear of the touch panel also includes a plurality of spaced apart conductive coatings indicated by reference numerals 90a–90o. The coatings 88 and 90 are arranged such that a portion of the coating 88 and one of the coatings 90 is located directly beneath each of the conductive coatings 92 on the front of the panel.

Referring now to FIGS. 4 and 5 it can be seen that conductive coating 88 and conductive coating 90 each forms a capacitance with the coating 92, respectively indicated by reference numerals 96 and 98 in FIG. 5, such that the two capacitors are connected in series. Normally, the touch pad drive circuit 56 applies a signal to capacitors 96 and 98 in series, which is then detected by a level detector circuit 100. However, when a person touches one of the conductive coatings 92, the human body capacitance to ground $C_B$ is introduced into the circuit. When $C_B$ is introduced into the circuit, the level of the signal from the touch pad drive circuit 56 at the level detector circuit 100 will be greatly attenuated, thus indicating that the area 92 has been touched.

DESCRIPTION OF THE DIGITAL LOGIC CIRCUITRY

In FIG. 6 there is shown a block diagram of the digital logic circuitry employed in the integrated circuit 20. The integrated circuit 20 may be fabricated with P-channel metal-oxide semiconductor technology (P-MOS) using negative logic. However, it will be understood by those skilled in the art that the present invention may be fabricated with other technologies as well.

In accordance with the present invention, the digital logic may include three main sections: a control logic section 102, a read only memory (ROM) section 104, and a random access memory (RAM) section 106. These three sections work together to take inputs from the touch plate keyboard and control the output display and the high voltage output to the magnetron of a microwave oven.

One of the purposes of the control logic is to receive entries from the touch plate on lines 108 and to segregate legitimate keyboard entries from incorrect entries. The control logic also receives a 60 HZ signal on line 60 which is shifted so that it is out of phase with the phase of the household line voltage. Other inputs to the control logic include a start signal from interface circuit 18 which is initiated when the start switch 16 is depressed and which is maintained through holding contact 32. After receiving a start signal, the control logic supplies a gating signal on line 24 to gate triac 22 and render it conductive. The gating signal on line 24 is maintained by the control logic as long as a signal is received from interface circuit 18. The control logic receives a "microwave time=0" signal on line 110 which de-energizes the high voltage output and removes the gating signal from line 24, and also receives a "1 sec." signal on line 112 which is used to energize the buzzer through the buzzer power circuit 76. The control logic section also receives a signal labeled 10 sec., the purpose of which is used to set the power level as will be hereinafter described.

The control logic also controls the various outputs of the system with the exception of the displays which it indirectly controls. In addition to providng a gating signal on line 46 for the high voltage output, the control logic section 102 also provides an "end of cycle output" on line 114 for the buzzer. The indicators 70 which indicate the present operating mode of the microwave oven are energized by the outputs of the display power circuits 68 and signals on lines 116 and 118 from the control logic section. In addition, the control logic provides a "number strobe signal" on line 120 which enables an input number latch 122. Finally, one of the most important functions of the control logic section 102 is to output a binary 3 bit control code on lines designated by reference number 124, the purpose of which will be described later.

The integrated circuit of the present invention also includes a four phase assynchronous clock, indicated by reference number 126, which provides the four signals $\phi_1$, $\phi_2$, $\phi_3$, and $\phi_4$, a timing signal on line 128 for the ROM 104, and a timing signal designated TIMING on line 130. The four signals $\phi_1$, $\phi_2$, $\phi_3$, and $\phi_4$ and the timing signals on lines 128 and 130 are derived from a 200 KHZ assynchronous clock signal T on line 132.

The ROM 104 is continuously cycled by the timing signal on line 128 at a 12.5 KHZ rate through 80 binary words which are each 12 bits long. Of each of the ROM words, 3 bits representing a control code are applied to a control code comparator via lines 134, 5 bits representing an instruction code are applied to an instruction decode logic circuit 136 via lines 138 and 4 bits are applied to RAM 106 via lines 140. In addition, the ROM address is loaded into input number latch 122 via lines 139 whenever the latch 122 is enabled by the number strobe on line 120.

The 80 words stored in ROM 104 are represented by eight groups, with a control code assigned to each group. As the ROM 104 cycles, the two control codes (one on lines 124 from the control logic and one on lines 134 from the ROM) are constantly being compared. Only when the two control codes compare will that group of ROM instructions be executed.

The logic circuitry of the present invention also includes an A.L.U. (Arithmetic Logic Unit) CONTROL ROM 141 which controls various arithmetic functions performed in the A.L.U. (Arithmetic Logic Unit) section 143. Finally, binary information is transferred from and to the RAM 106 from and to the ALU 143, from the input number latch 122 and to the BCD output latches 145 by a DATA BUSS which interconnects these components.

DESCRIPTION OF ROM 104 AND ASSOCIATED CIRCUITRY

Referring now to FIG. 7, there is shown in block diagram form, a preferred method for implementing the main ROM 104. This method may include the use of an ROM 148 in which there are 20 words stored, each word being 48 bits long. The 20 ROM words are addressed by an addressing circuit 150 which sequentially applies a logic 1 to the horizontal lines of the ROM 148. The ROM address circuit 150 receives the next ROM address in binary form on lines 152 from the ROM 148 and applies a logic 1 to the next ROM address line as soon as the signal designated $T.\phi_7$ on line 128 goes to a logic 1. When the ROM address circuit 150 reaches ADDRESS 19, a logic 1 is applied to the ADDRESS 0 with receipt of the next logic 1 on line 128 such that the ROM 148 is constantly being addressed from ADDRESS 0 to ADDRESS 19. In addition, the four least significant bits of the present ROM address in BCD form on lines 152 are loaded into input number latch 122 when enabled by a number strobe signal on line 120. The input number latch 122 is enabled by the number strobe signal when the control system is in a read in mode and the ROM address on lines 152 is equal to the particular digit (0-9) which the user has touched.

The ROM 148 also provides a logic 0 on line 149 whenever one of ROM addresses 0-9 are at logic 1, provides a logic 0 on line 151 whenever one of ROM addresses 0-14 are at logic 1 and provides a logic 0 on line 155 whenever one of ROM addresses 19, 0, 1 or 2 are at a logic 1.

The addressed 48 bit word in ROM 148 is applied to a page circuit 154 which selects 12 of the 48 bits in accordance with the instructions on the output lines of a page address circuit 156. The output of page address circuit 156 is also applied to circuit 160 which produces the DISPLAY MULTIPLEX DRIVE signals A, B, C and D. The page address circuit 156 is essentially a four bit state counter which is toggled every time ADDRESS 19 of ROM 148 is addressed.

Thus, it can be seen that the overall combination of ROM 148, ROM address circuit, page address circuit 156, and page circuit 154 provides an 80 word by 12 bit read only memory. Although it will be understood that the preferred method for implementing this 80 word by 12 bit read only memory is by the method shown in FIG. 7, it should be noted at this time that an 80 word by 12 bit read only memory may be used with minor modifications. From hereon, whenever reference is made to ROM 104 it will be understood that the arrangement shown in FIG. 7 is being referred to.

Referring now to FIG. 8, there is shown, in diagrammatic form, a preferred arrangement for the internal clock circuits of the I.C. A conventional 200 KC clock indicated by reference numeral 158 may be used to control a conventional four phase internal clock circuit designated by reference numeral 126. Throughout the following description of the preferred embodiment of the invention reference will be made to the T and $\overline{T}$ signals of the 200 KHZ clock 158 and the $\phi$, $\phi_2$, $\phi_3$, and $\phi_4$ signals of the four phase clock 126. It can be seen that each phase consists of a pulse which is the same duration as one cycle of the clock signal T.

The 200 KHZ internal clock circuit 158 may be any conventional clock circuit known in the prior art which provides a square wave output switching between logic 0 and logic 1. Since the accuracy of the time of day clock and the timer in the present invention are dependent on the accuracy of the frequency of the household line voltage, the 200 KHZ internal clock 158 need not be extremely accurate. For this reason, the frequency tolerance on the 200 KHZ internal clock circuit 158 may be as much as ±20%.

Because the household line voltage is used as a frequency standard for the time of day clock and the timer, it is necessary that certain signals be derived which are representative of the 60 HZ line frequency and which are synchronized with the internal clock signals.

Figure 9A:
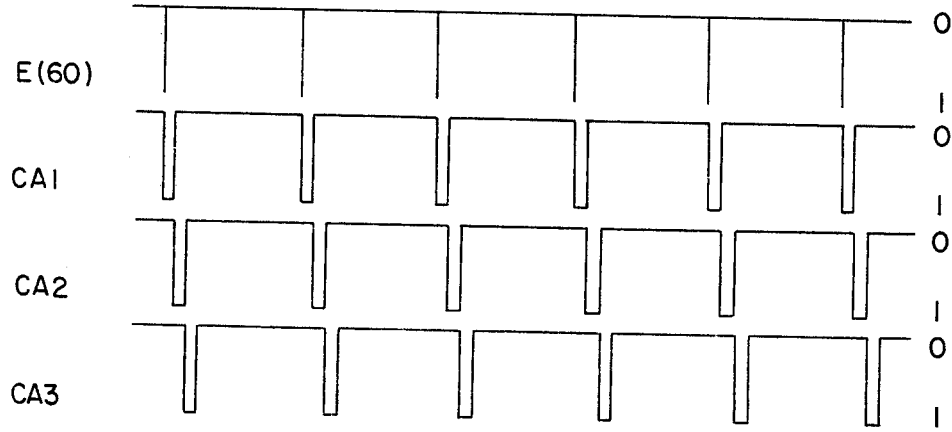
FIG. 9A is a timing diagram of the signals generated by the circuit represented in the schematic in FIG. 9.

Referring now to FIGS. 9 and 9A, the logical circuitry by which the asynchronous clock signal T is synchronized with the household line voltage is shown. The signal on line 60 from the phase shifting and shaping circuit 68 is a 60 HZ square wave which has a rising edge whenever the input line voltage falls to its most negative point and a falling edge whenever the input line voltage swings to its most positive point. The 90° (60 HZ) signal is applied to a delay flip-flop 162, the output of which is applied to a second delay flip-flop 164 and which are both clocked by the 200 KHZ timing signal T. It can be seen that whenever the 90 (60 HZ) signal returns to a logic 0 from a logic 1, the output of delay flip-flop 162 will swing to a logic 0 after one clock pulse. After another clock pulse the $\overline{Q}$ output of delay flip flop 164 will swing to a logic 1. Thus, it can be seen that the inputs to gate 166 will all be at logic 0 during the second clock pulse following change of the 90 (60 HZ) from 1 to 0. Therefore, a signal, labeled E (60), will go to logic 1 during that one clock pulse. The E(60) signal sets the cross coupled 168 so that gate 170 will apply a 1 delay flip-flop 172 which is clocked by a signal designated EOR. The EOR signal (End of ROM) is one of the nineteen instruction codes and occurs every time the ROM 104 has cycled through its 80 words. It can be seen that gate 170 will be disabled as soon as CA 1 goes to logic 1 and that the logic 1 level will be shifted through delay flip-flops 174 and 176 each time the EOR signal goes to logic 1. Eventually, CA3 will go to logic 1 and it can be seen that this logic 1 will reset the cross couple 168, so that the sequence may be repeated.

RAM AND ASSOCIATED CIRCUITRY

Figure 10:
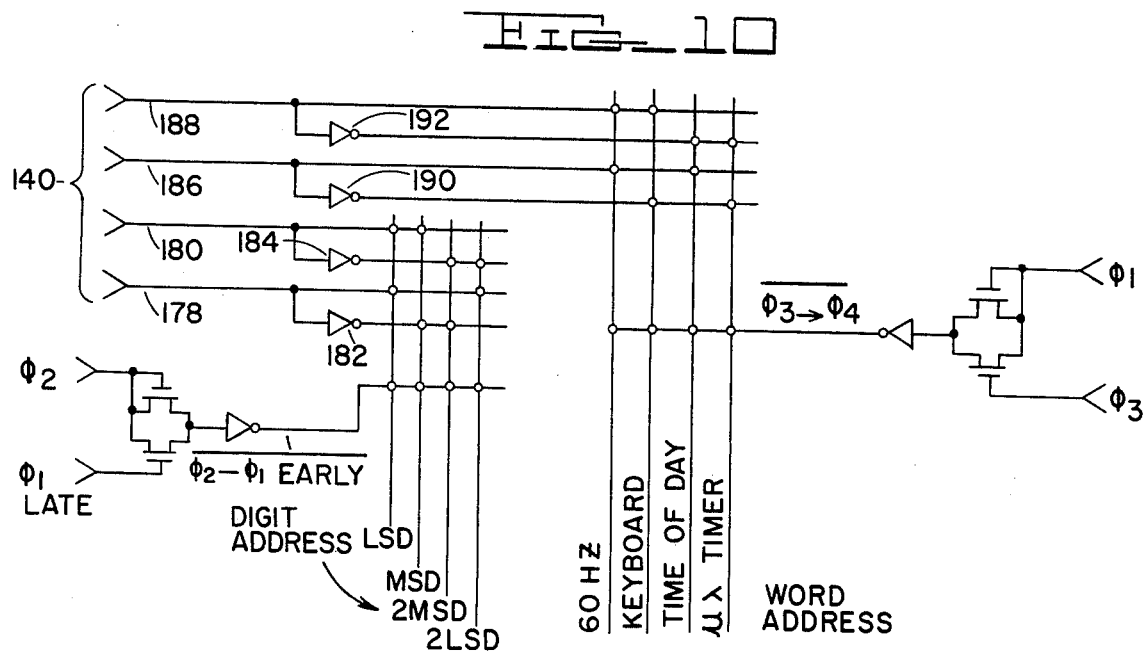
FIG. 10 is a logic schematic of the RAM addressing circuitry.

FIG. 10 depicts, in schematic form, the preferred method for addressing the RAM 106. In this method, the RAM address code from the ROM 104 is supplied on lines 140. Since the RAM 106 stores information relating to the microwave timer downcount, the time of day, the keyboard number, and the 60 Hz count in BCD form, and because the digits of the BCD words are updated digit by digit, it is necessary that the RAM address select both a word and a particular digit of that word.

Figure 10A:
FIG. 10A is an enlarged view of a portion of FIG. 10.

Referring now to FIG. 10, the two bit binary word on lines 178 and 180 is inverted an applied to lines 182 and 184. The binary representation on lines 178, 180, 182 and 184 is applied to a matrix decoder which consists of the horizontal lines 178-184 and vertical lines labeled from left to right: LSD (least significant digit), MSD (most significant digit), 2MSD (second most significant digit), and 2 LSD (second least significant digit). The circles at some of the intersections of the vertical lines and the horizontal lines represent a transistor to ground as shown in FIG. 10A. Thus, it can be seen, for example, that an application of a logic 1 on line 178 will pull line LSD, which is normally at a logic 1 level, to ground or logic 0 level. It can be seen that each of the four unique binary numbers which can be applied to lines 178 and 180 will leave one of DIGIT ADDRESS lines at logic 1. In a similar manner, the proper WORD ADDRESS line is allowed to remain at a logic 1 by a second matrix decoder which decodes the information on lines 186, 188, 190 and 192.

Figure 10B:
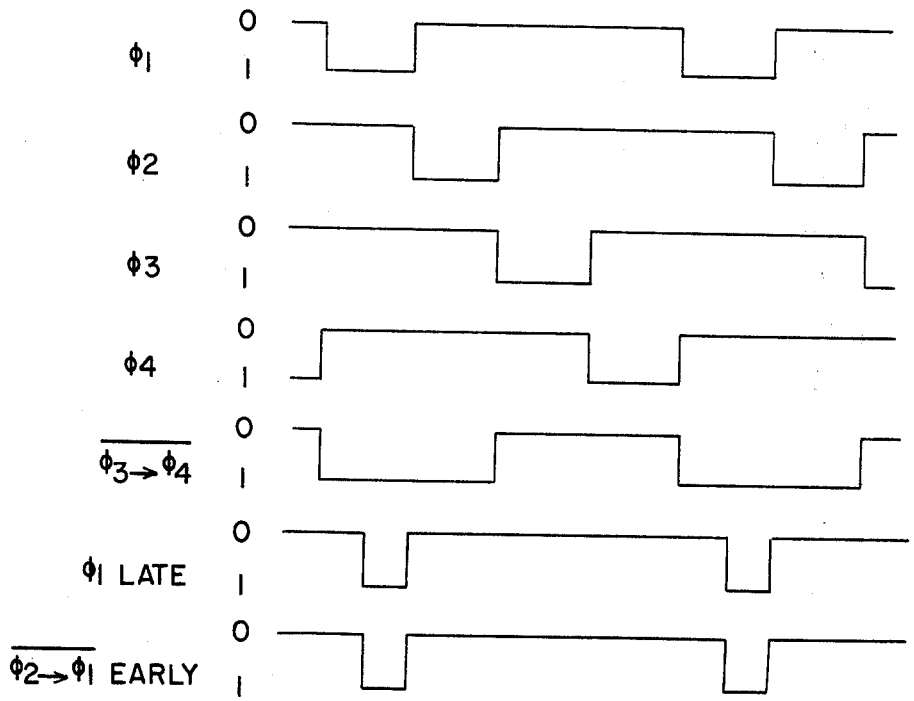
FIG. 10B is a timing diagram of some of the signals referred to in FIG. 10.

In accordance with the preferred embodiment of the invention, provision is made to ensure that the RAM 106 is addressed only at predetermined times. Thus, referring to FIGS. 10 and 10B, it can be seen that all the word address lines will be at ground or logic 0 when the signal designated $\overline{\phi 3 \rightarrow \phi 4}$ is at logic 1. In the same manner, all the digit address lines will be at logic 0 when the signal designated $\overline{\phi 2 \rightarrow \phi 1}$ early are both at logic 1. Therefore, it can be seen that the RAM 106 will be addressed only when $\overline{\phi 3 \rightarrow \phi 4}$ and $\overline{\phi 2 \rightarrow \phi 1}$ early are both at logic 0.

Referring to FIG. 11, a typical RAM cell is shown along with the logical circuity necessary for operation of RAM. In the preferred embodiment of the invention, the RAM is comprised of cells of the type which allow a 0 or a 1 to be read out but only allows 0's to be written in. Accordingly, if it is desired to write a logic 1 from the data buss into a RAM cell, it is necessary that the cell be PRESET to a logic 1, and subsequently when a 1 is applied to the cell via the data buss, the 1 already stored in the cell is not altered. If, however, an 0 is applied to the cell via the data buss, the 1 stored therein from the PRESET operation is changed to a logic 0. Referring to FIG. 11, it can be seen that information will not be read from, or into, the RAM cell nor will the cell be preset until both the DIGIT ADDRESS line and the WORD ADDRESS line for that particular cell go to logic 1. The PRESET signal is generated by the ALU CONTROL ROM 141 during $\phi 3$ when instructions pertaining to loading words into the RAM 106 are received from the main ROM 104. Because of the cells of the RAM 106, prior to presetting a cell to logic 1, it is necessary to prechange the data buss lines to logic 1. Thus, whenever $\phi 2$ is a logic 1 it can be seen that transistors 194, 196 778, 780, 782, 784 (FIG. 18) will be turned on, thus charging line 198 and the data buss lines to a logic 1. Then, as soon as $\phi 3$ goes to a logic 1, a PRESET signal will be generated by the INSTRUCTION DECODE LOGIC 136 if information is to be written in from the data buss and a logic 1 is preset into the addressed cells. Subsequently, when $\phi 4$ goes to logic 1, the proper information is loaded onto the DATA BUSS and written into the addressed RAM cells.

Referring now to FIG. 10C, the RAM 106 words are schematically depicted for the sake of clarificaton. The RAM 106 has the capability of storing 16 BCD words, which are arranged into four groups. Each BCD word is represented in FIG. 10C by a square and each is characterized by a unique number in the upper right hand corner of the square. The first group, labeled 60 HZ, counts the cycles of the 60HZ input line voltage. BCD RAM word No. 0, labeled 1/60 SEC, is incremented by 1 for every 60 HZ line cycle beginning with 1. When the 1/60 SEC word counts from 1 up to 9 and then to 0, a carry flip flop within the ALU notices this fact and a 1 is added to RAM word No. 4, labeled 1/6 Sec. The 1/6 SEC RAM word counts from 1 to 5 and then to 0. Again, the carry flip flop notices this condition and adds a 1 to RAM word No. 12, labeled 1 SEC. The 1 SEC RAM word counts up 10 and carries a 1 over to the 10 SEC RAM word. The second group, labeled TIME OF DAY, continues the 60 HZ upcount such that 1 is added to RAM word No. 2, labeled 1 MIN. after the 10 SEC word has counted from 1 to 5 and back to 0. In a similar manner, the 10 MIN word is incremented by 1 when the 1 MIN word has been incremented by 10, the 1 HR word is incremented by 1 every time the 10 MIN word is incremented by 6 and the 10 HR word is incremented every time the 1 HR word is incremented by 10. The group labeled KEYBOARD stores information which has been entered by the user. The user enters the most significant digit of the information first and this is stored in BCD RAM word No. 1, labeled LSD. The keyboard entries are serially entered so that when a new entry occurs, the existing information in the KEYBOARD word is shifted to the right. The Group labeled $\mu\lambda$ TIMER is essentially a downcounter which begins with the amount of time which has been transferred from the KEYBOARD GROUP in parallel fashion. BCD RAM word No. 3, labeled 1 SEC is decremented by 1 every second while in the TIMER, DEFROST, SLOW COOK, and COOK MODES. When BCD RAM word No. 3 has been decremented by 10, the BCD RAM word No. 7, labeled 10 SEC is decremented by 1. In a manner similar to the TIME OF DAY and 60 HZ Groups, when BCD RAM word No. 7 has been decremented by 6, BCD RAM word No. 15, labeled 1 MIN is decremented by 1, and when this has been decremented by 10, BCD RAM word No. 11, labeled 10 MIN is decremented by 1.

CONTROL LOGIC

Referring to FIG. 12A, the preferred form of the input circuitry is shown. This circuitry includes a plurality of transistors, one of which is indicated by reference numer 200, which are sequentially turned on by the ROM addressing. Of each transistor 200, one of the terminals is connected to a bias potential and the other terminal is connected to the proper conductive coating on the back side of the touch plate (see FIG. 3). Normally, when the touch plates have not been touched by a user, the bias potential and the signal from the touch pad drive circuit which occurs when $\phi_3$ is at logic 1 are applied to the input of an inverter 202. The inverter 202 is designed such that its output in the "untouched" condition is a logic 1 when $\phi_3$ is a logic 1, thus applying a logic 1 to the input of cross-couple 204. The other input to cross-couple 204 is a logic 1 at $\phi_3$ to $\phi_1$ in the untouched condition. Therefore the output of inverter 206 will be a logic 0 in the "touched" condition when $\overline{\phi}_4 = 0$, PAGE 1 = 0, $\overline{0\text{-}14} = 0$, and $\overline{CAI} = 0$.

In order to ensure that an entry is a legitimate entry and not the receipt of a signal from some other source or the mistaken momentary touch of a touch switch by the user, the preferred embodiment of the present invention requires that a user touch a desired touch switch for a minimum of 64 msec. Referring to FIG. 12A it can be seen that the two T flip flops 208 and 210 form a two bit count by four counter which is clocked by $\overline{CA3}$. Since CA3 occurs only once every cycle of the 60 HZ line voltage, the count by four counter will take approximately 64 msec to cycle through all four states. The Q states of flip flops 208 and 210 are applied to gates 212 and 214 and the $\overline{Q}$ states of flip flops 208 and 210 are applied to gates 216 and 218. It can be seen that when a switch has been touched so that a 0 appears at the output of inverter 206 and the Q outputs of flip flops 208 and 210 are both at logic 0, the output of gate 212 will go to a logic 1, thus setting the cross couple 220. The output of the cross-couple 220 will therefore go to logic 0 which is coupled back to the input of gate 216. A 1 will appear at the output of gate 216 on line 238 when the $\overline{Q}$ outputs of flip flops 208 and 210 are both at O and the output of inverter 206 is at logic 0, indicating a switch is still being touched. The 1 output of gate 216 which occurs a minimum of 64 msec after the switch was initially touched is inverted and applied to a gate 222 which generates the NUMBER STROBE signal if the ROM is at address 0-9 ($\overline{0-9} = 0$) and a DISABLE KEYBOARD signal has not been received. It will be readily seen that the output of gate 216 goes to a logic 1 and the cross couple 220 will be reset when $\overline{T} = 1$ gating transistor 217. Moreover, after the output of gate 216 goes to logic 1, it will be appreciated that the output of gate 218 on line 234 will go to logic 1 when $\overline{CA3}$ goes to logic 0. In addition, the signals labeled CLOCK DISABLE on line 224, DISABLE KEYBOARD on line 226, and the signal labeled $\overline{A\ NUM\ PUSHED}$ online 228 are applied to the inputs of a NOR gate 230, the output 231 of which enables or disables the TIMER SET, DEFROST SET, and SLOW COOK SET functions and allows the user to actuate only the CLOCK SET and RESET touch switches if the other functions are disabled, as will hereinafter be described. When a user has actuated the start switch 16, line 232 will go to a logic 1 which prevents the output of gate 216 from going to a logic 1. Thus, entries of numbers and functions after the START switch 16 has been depressed will not be recognized by the system. Finally, the output of gate 214 on line 236 will go to a logic 1 when the Q outputs of flip flops 208 and 210 are zero and $\overline{CA3} = 0$.

Referring to FIG. 12B, the signal on line 236 goes to a logic 1 every fourth cycle of the 60 HZ line voltage; thus the output of cross-couple 240 normally remains at logic 0 as long as the NUMBER STROBE line does not go to logic 1. In addition, the signal on line 234 goes to a logic 1 every fourth line cycle, and it can be seen that the output of gate 242 will go to a logic 1 every fourth line cycle. Thus, as long as a NUMBER STROBE signal has not been received, the output of cross couple 244 which is applied to gate 246 is a logic 1 and therefore the signal labeled No. 1 RESET will be logic 0 as long as the NUMBER STROBE signal has not been received. Furthermore, if a NUMBER STROBE signal has not been received. Furthermore, if a NUMBER STROBE signal has not been received, the input to delay flip flop 248 wil be at logic 0, and thus the Q outputs of flip flops 250 and 252 will normally remain at logic 0. Therefore, a logic 1 will normally be applied from the $\overline{Q}$ output of flip flop 248 to gate 254, and thus the signal labeled READ IN will normally be at logic 0. Also, the $\overline{Q}$ output of flip flop 250 will normally be at logic 1, and thus the signal labeled NUM CC STROBE at the output of gate 256 will normally be a logic 0.

However, when a NUMBER STROBE signal is received, line 236 will be at logic 0 and the output cross couple 240 will be set at logic ;b 1. The NUMBER STROBE signal will also set cross couple 244 so that a 1 is applied to the D input of flip flop 248 and a 0 is applied to gate 246. Thus, after occurrence of a NUMBER STROBE signal, the No. 1 RESET signal will go to logic 1 if the signal labeled A NUM PUSH is a logic 0. The No. 1 RESET signal will return to logic 0 when flip flop 248 is clocked by the end of ROM (EOR) signal and a logic 1 appears at its Q output. When this occurs, the $\overline{Q}$ output of flip flop 248 goes to logic 0 and the READ IN signal at the output of gate 254 becomes a logic 1. The READ IN signal returns to logic 0 when flip flop 250 is clocked by EOR and its Q output goes to logic 1. At this point, the output of gate 256 labeled NUM CC STROBE becomes a logic 1, and remains that way until the Q output of flip flop 252 goes to a logic 1. Of course, after receipt of the NUMBER STROBE signal it can be seen that the cross couple 240 will be reset when line 236 goes to logic 1.

Figure 12C:
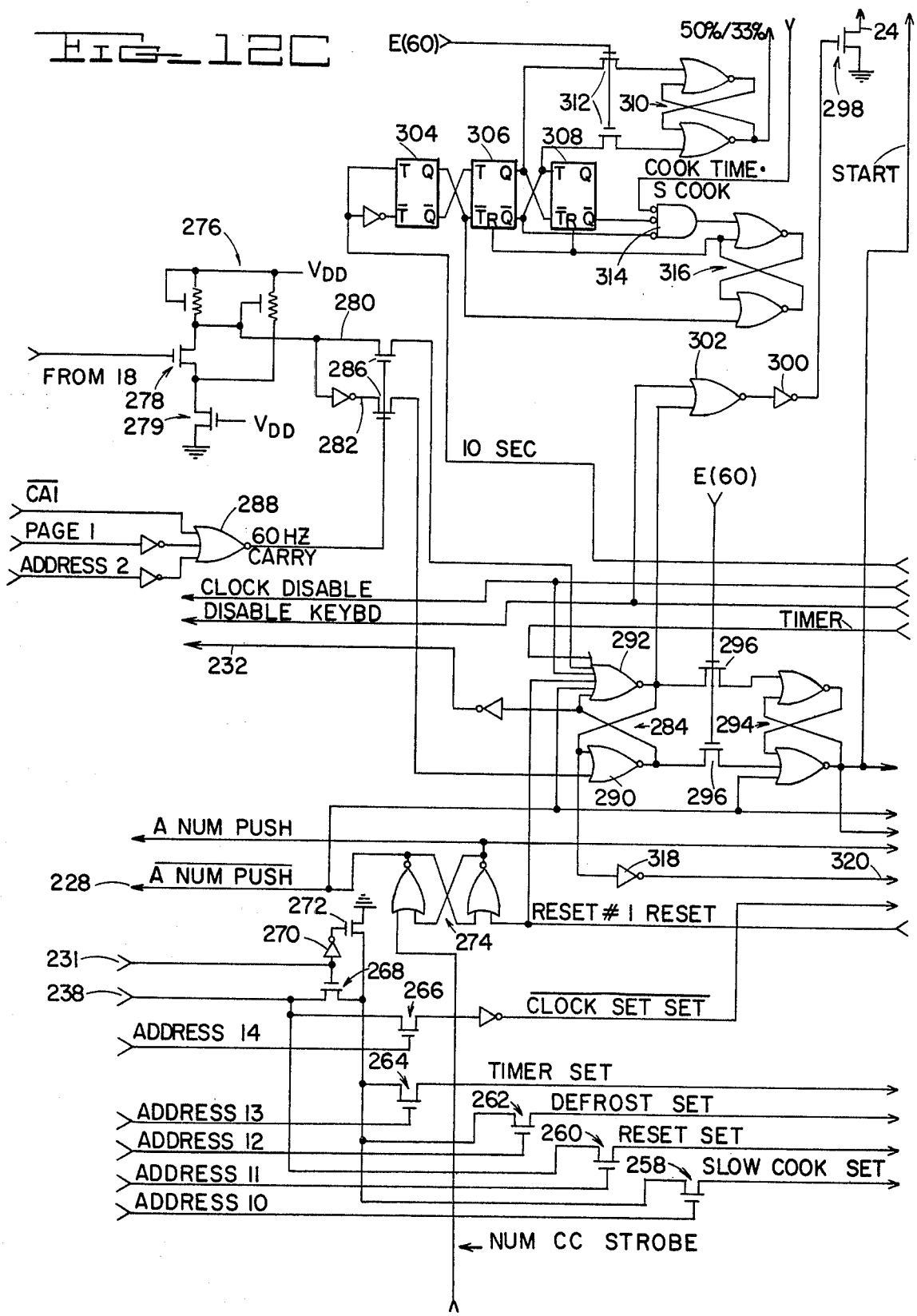

Referring now to FIG. 12C, the input logic circuitry of the present invention includes circuit means to ascertain whether certain function switches have been touched by the user. Each of the function switches shown in FIG. 2 (SLOW COOK, RESET, DEFROST, TIMER, and CLOCK) has a transistor associated with it, respectively identified as transistors 258, 260, 262, 264 and 266. The gate of each one of these transistors is connected to a corresponding address of the main ROM. Thus, ADDRESS 10 turns on transistor 258 when it goes to a logic 1 and if the input of transistor 258 is at a logic 1, the output signal labeled SLOW COOK SET will go to a logic 1, indicating that the SLOW COOK touch switch had been actuated. In the same manner, transistor 260 is gated by ADDRESS 11 and the output labeled RESET SET indicates whether the RESET switch had been actuated; transistor 262 is gated by ADDRESS 12 and the output labeled DEFROST SET indicates whether the DEFROST touch switch had been actuated; transistor 264 is gated by ADDRESS 13 and the output labeled TIMER SET indicates whether the TIMER touch switch had been actuated; transistor 266 is gated by ADDRESS 14 and the inverted output labeled $\overline{CLOCK\ SET\ SET}$ indicates whether the CLOCK touch switch had been actuated. The purpose of NOR gate 230 (FIG. 12A) is to prevent a user from entering into the TIMER, DEFROST and SLOW COOK functions until certain conditions have been satisfied. Thus, before entering any of these functions, the user must have entered a number ($\overline{A\ NUM\ PUSH} = 0$), and the CLOCK DISABLE and DISABLE KYBD signals must be at logic 0. When these conditions are satisfied and line 231 goes to a logic 1, a transistor 268 is rendered conductive, connecting the input of transistors 258, 262, and 264 to line 238. If, for example, the TIMER touch switch has been actuated, line 238 will go to logic 1 simultaneously with ADDRESS 13 (after the 64 msec minimum delay), transistor 264 will be gated, thus bringing the TIMER SET signal to logic 1. If line 231 is at a logic 0 level, indicating that the conditions for entering the TIMER, DEFROST, and SLOW COOK functions are not satisfied, the logic 1 at the output of inverter 270 will gate transistor 268, bringing the input of transistors 264, 262 and 258 to ground or logic 0. It can be seen that transistors 260 and 266 are not affected by the logic signal on line 231, permitting a user to enter the CLOCK and RESET functions at any time, except after the START switch has been actuated, bringing line 232 to a logic 1.

Referring to FIG. 12C, the A NUM PUSH signal is an indication as to whether or not a number has been entered into the system. The NUM CC STROBE signal which is generated as a result of a NUMBER STROBE signal and which occurs after a number has been legitimately entered is applied to the input of a cross couple 274 such that the A NUM PUSH output goes to a logic 1 and the $\overline{\text{A NUM PUSH}}$ output goes to a logic 0. The cross couple 274 will remain in this condition until the RESET No. 1 RESET signal goes to a logic 1 as will hereinafter be described. Referring to FIGS. 12B and 12C, it should be noted that before entry of the first number into the system, A NUM PUSH = 0 and the No. 1 RESET signal will be produced as soon as NUMBER STROBE = 1. Then, the NUM CC STROBE will set cross couple 274 so that A NUM PUSH = 1 and No. 1 RESET = 0. Thus No. 1 RESET occurs only after entry of the first number into the system.

Referring still to FIG. 12C, a start detect circuit generally indicated by reference numeral 276 is included in the IC 20 to detect when a "start" signal has been received from interface circuit 18. If the start switch 16 is not closed or if holding contact 32 (see FIG. 1) is not closed, transistor 278 will be off and line 280 will be at $V_{DD}$ or a logic 1. Thus, line 282 will be at logic 0. The binary signal on lines 280 and 282 is passed to a cross couple 284 by a pair of transistors 286 which are rendered conductive when the output of NOR gate 288 labeled 60 HZ CARRY equals a logic 1. It can be seen that 60 HZ CARRY = CA1.PAGE 1.ADDRESS 2. Thus, 60 HZ CARRY goes to a logic 1 whenever CA=1 and PAGE 1=1 and ADDRESS 2=1.

The cross couple 284 consists of a first NOR gate 290 which receives the signals from line 282 and the output of a second NORgate 292. NORgate 292 receives the output of gate 290, the signal on line 280 from the start detect circuit 276, the signal labeled TIMER, the CLOCK DISABLE signal, the RESET No. 1 RESET signal, and the $\overline{\text{A NUM PUSH}}$ signal. If the start signal has not been received, the 1 on line 280 and the 0 on line 282 will be applied to NORgates 292 and 290, respectively, bringing the output of NORgate 292 to a logic 0 and the output of NORgate 290 to a logic 1. These outputs are connected to the inputs of a second cross couple 294 through transistors 296 which are gated by E(60). If the start button has not been depressed, it can be seen that the output of crosscouple 294, labeled START, will be a logic 0. In addition, it should be noted that the $\overline{\text{A NUM PUSH}}$ signal is also applied to the cross couple 294 so that whenever A NUM PUSH = 1 the START signal is a logic 0, indicating a number had not been entered into the system prior to the attempt by a user to start the over.

When a user depresses the start switch 16, circuit 18 will gate transistor 278, thus connecting line 280 to ground through transistors 278 and 279. Accordingly, line 282 will go to logic 1 and the next time 60 HZ CARRY goes to logic 1, cross couple 284 will be set as long as the TIMER, CLOCK DISABLE, RESET No. 1 RESET, and the $\overline{\text{A NUM PUSH}}$ signals are all at logic 0 level. When cross couple 284 is set, the output of NORgate 290 is at a logic 0 and line 232 is at logic 1 thus preventing the entry of further numbers or functions into the system. In addition, the output of gate 292 and the DISABLE KEYBOARD signal are applied to the inputs of a NORgate 302, the output of which is inverted by inverter 300. The signal from inverter 300 is applied to the gate of a transistor 298 which, when gated, connects line 24 to ground. Gate 302 and inverter 300 essentially comprise an OR gate and it can be seen that transistor 298 will be turned on when either DISABLE KEYBOARD = 1 or the output of gate 292 is a logic 1. Since the logic state of line 24 controls triac 22 which, in turn, controls the energization of the coil 30 of the push to start relay, it can be seen that if the proper binary number is received by cross-couple 284 from start detect circuit 276 and if other conditions are satisfied at the input of NORgate 292 (e.g. TIMER = 0, etc.), the triac 22 will be gated by circuit 26 (see FIG. 1) to energize coil 30, closing contact 32. The start signal to the start detect circuit 276 from interface circuit 18 will thereafter be maintained through holding contact 32. The coil 30 of push to start relay will be deenergized when the output of gate 292 and the DISABLE KEYBOARD signal both fall to logic 0, thus bringing the output of inverter 300 to the logic 0 level.

Referring again to FIG. 12C, the signal labeled 10 SEC., which is a pulse occurring every 10 seconds and which is produced in the ALU section as will hereinafter be described, is applied to the input of a T flip flop 304. The inverted output of T flip flop 304 is applied to T flip flop 306, the inverted output of which is applied to T flip flop 308. The outputs of flip flop 306 are applied to the inputs of a cross couple 310 via a pair of transistors 312 which are turned on by the E(60) signal. The signal labeled COOK TIME. S COOK is applied to the input of a gate 314, the output of which is connected to the input of a cross couple 316. The Q output of T flip flop 304 is connected to the other input of cross-couple 316 which has its output connected to the R (reset) input of flip flops 306 and 308. In operation, assuming COOK TIME . S COOK = 1, gate 314 will be inhibited and therefore the output of cross-couple 316 will be at logic 0. It can be seen that, in this condition, the output of T flip flop 306 will remain at any state for two successive pulses at the input of gate 304 and, thus, the output of flip flop 306 changes every 20 seconds. Therefore, the output of cross couple 310 is a logic 1 for 20 seconds and a logic 0 for 20 seconds. In other words, the output of cross couple 310 is a logic 1 50% of the time and a logic 0 the other 50% of the time. Since the output of cross couple 310 is used to turn on the oven magnetron, as will hereinafter be described, it can be seen that the magnetron will be on for 20 seconds and off for 20 seconds in the SLOW COOK mode. In the event COOK TIME . S COOK = 0, it can be seen that the output of cross couple 316 will be a logic 1 when the Q output of T flip flop 304 is a logic 0, and the $\overline{Q}$ output of flip flops 306 and 308 are logic 0. Flip flops 306 and 308, which normally form a two bit, count by four counter will therefore be reset after the third state and are thus converted into a two bit, count by three binary counter. Thus, the output of cross couple 310 will be logic 0 for 40 seconds and a logic 1 for 20 seconds (33% of the time). In this condition (DEFROST MODE) the output of cross couple 310 will turn the magnetron on for 20 seconds out of every 60 seconds.

Referring still to FIG. 12C, the output of NORgate 292 is inverted by inverter 318 and supplied to the remainder of the CONTROL LOGIC SECTION on line 320.

Referring now to FIGS. 12D and 12E the TIMER SET signal is applied to the input of a cross couple 322, the other inputs of which are DEFROST, $\overline{\text{DEFROST}}$ . S COOK, and RESET No. 1 RESET. Cross couple 322 consists of NORgates 324 and 326, the outputs of which are connected to cross couple 328 via transistors 330 which are turned on by E(60). The output of cross couple 328 is applied to a gate 332 the other input of which is the inverted output of NOR gate 324. In operation, if cross couple 322 has been reset by a logic 1 on any of the RESET No. 1 RESET, $\overline{\text{DEFROST}}$ . S COOK or DEFROST lines, it can be seen that the output of cross couple 328 will be a logic 0. As soon as the TIMER SET signal goes to a logic 1, as a result of a user actuating the TIMER switch, cross couple 322 will be set and the output of NORgate 324, labeled TIMER, will go to a logic 1, thus applying a logic 0 to the second input of gate 332. As soon as the next E(60) pulse occurs after the TIMER SET signal has gone to logic 1, the output of cross couple 328 will go to logic 1. Therefore, the signal at the output of gate 332, labeled TIMER O.T., will be a logic 1 only until the first E(60) pulse occurs after the TIMER SET signal has gone to logic 1. In addition, the output of cross couple 328 and the START signal are applied to NORgate 334 the output of which is labeled $\overline{\text{START + TIMER}}$.

In FIG. 12D, the signal on line 320, the START signal and the DISABLE KYBD signal are all applied to gate 336, the output of which is labeled START O.T. If the START switch 16 has been depressed, line 320 will switch from logic 0 to logic 1 only when 60 HZ CARRY = 1. This occurs only when CA1 = 1. It can be seen therefore, that line 320 and the START signal will both be at logic 0, simultaneously, only until the E(60) signal applies the output of cross couple 284 to cross couple 294. The START O.T. signal is applied to NORgate 338, the output of which will be logic 0 if START O.T. = 1. Since START O.T. is a logic 1 for substantially one complete cycle of the 60 HZ input voltage beginning with CA1, when $\overline{\text{CA2}}$ = 0 the output of gate 340 will go to a logic 1, thus setting the cross couple 342 so that DISABLE KYBD = 1. When the DISABLE KYBD signal goes to logic 1 it can be seen that gate 336 will be inhibited and START O.T. will go to logic 0. In addition, it should be noted that the DISABLE KYBD signal will also go from a logic 0 to a logic 1 whenever TIMER O.T. goes to a logic 1. It should suffice to say that TIMER SET and TIMER O.T. will go to a logic 1 when $\overline{\text{CA1}}$ = 0 and subsequently when $\overline{\text{CA2}}$ = 0, DISABLE KYBD will go to a logic 1. Finally, it should be noted that once DISABLE KYBD goes to a logic 1 it will remain at that logic level until cross couple 342 is reset by the RESET No. 1 RESET signal going to a logic 1.

When the RESET touch switch is actuated, line 238 will go to a logic 1 when $\overline{\text{CA1}}$ = 0 and transistor 260 (FIG. 12C) will be rendered conductive when ADDRESS 11 goes to logic 1, bringing the RESET SET signal to a logic 1. The RESET SET and CA3 signals are applied to cross couple 344 such that the output thereof, labeled $\overline{\text{RESET}}$, goes to a logic 0 when RESET SET = 1 and CA3 = 0. The $\overline{\text{RESET}}$ signal is applied to gate 346 along with CA1 and gate 348 along with CA2. The output of gate 346 which is RESET.CA1 and the output of gate 348 which is RESET.CA2 are applied to a matrix encoder, generally indicated by reference numeral 350, which develops the control code which is to be compared with the control code from the ROM 104. The output of gate 346 along with the signal labeled $\mu\lambda$ = 0 STROBE and the signal labeled CLOCK SET.CA2 are applied to a NORgate 352 the output of which is inverted by inverter 354. The signal at the output of inverter 354, labeled RESET No. 1 RESET is used to reset many of the cross couples already described and many of the cross couples which will hereinafter be described, whenever the RESET switch has been legitimately touched by a user ($\overline{\text{RESET}}$ = 0), whenever the microwave oven timer has counted down to zero ($\mu\lambda$ = 0 STROBE = 1) or whenever the Time of Day clock has been set as will be described later. Of the cross couples thus far described, it will be noted that the RESET No. 1 RESET signal resets the DISABLE KYBD cross couple 342 so that DISABLE KYBD = 0, resets the cross couple 322 so that TIMER = 0, resets the cross couple 274 so that A NUM PUSH = 0, and resets the cross couple 284 so that line 320 goes to a logic 1 and the START signal goes to logic 0.

Referring to FIGS. 12D and 12E, the 10 SEC signal which is a pulse occurring every 10 seconds, is applied to a cross couple 356, the output of which on line 358 is normally a logic 0 if the CLOCK touch switch has not been actuated. The signal on line 358, tne $\overline{\text{CLOCK SET SET}}$ signal, and the A NUM PUSH signal are applied to a gate 360, the output of which is connected to the input of a cross couple 362. Thus, if the CLOCK switch has been actuated ($\overline{\text{CLOCK SET SET}}$ = 0), line 358 is at logic 0, and a number has not been entered into the system (A NUM PUSH = 0), the output of gate 360 will go to logic 1 which will set cross couple 362 so that CLOCK DISABLE = 1 and a logic 0 is applied to the input of gate 364 from cross couple 362. At this point, since CLOCK DISABLE = 1, cross couple 284 will be held and transistor 298 will remain off. Cross couple 362 will remain in this condition until it is reset by RESET. CA1 or line 358 going to logic 1. It can be seen that the output of gate 364 will not go to logic 1 until a number has been entered ($\overline{\text{A NUM PUSH}}$ = 0) and the CLOCK touch switch has again been actuated ($\overline{\text{CLOCK SET SET}}$ = 0). However, as soon as the output of gate 364 goes to a logic 1, cross couple 366 will be set so that the output marked $\overline{\text{CLOCK SET}}$ goes to a logic 0. The $\overline{\text{CLOCK SET}}$ signal is applied to gates 368 and 370 along with CA2 and CA1, respectively, and the output of gates 368 and 370 (labeled CLOCK SET.CA2 and CLOCK SET.CA1, respectively) will go to a logic 1 when $\overline{\text{CA1}}$ and $\overline{\text{CA2}}$ go to a logic 0. When the output of gate 368 goes to a logic 1, cross couple 356 will be set so that line 358 goes to a logic 1. As soon as line 358 goes to a logic 1, cross couple 362 will be reset so that CLOCK DISABLE goes to a logic 0. Subsequently, when CA3 goes to a logic 1, cross couple 366 will be reset so that $\overline{\text{CLOCK SET}}$ goes to a logic 1. After this point it can be seen that cross couples 356, 362 and 366 will remain in their reset condition until the output of gate 360 goes to a logic 1.

Referring still to FIG. 12E, the SLOW COOK SET signal, which is a logic 1 when the SLOW COOK touch switch has been actuated, sets a cross couple 372, comprised of NORgates 374 and 376, which is reset by the RESET No. 1 RESET signal. The output of gate 374 is labeled S COOK and is a logic 1 when cross couple 372 has been set. The output of gate 376 is labeled $\overline{\text{S COOK}}$ and is a logic 0 when cross couple 372 has been set.

The DEFROST SET signal, which is a logic 1 pulse resulting from actuation of the DEFROST touch switch, is applied to the input of a NOR gate 378 which forms cross couple 380 with NORgate 382. The output of cross couple 380 is applied to the input of cross couple 384 comprised of NORgates 386 and 388 via transistors 391 which are gated by E(60). It will be apparent to those skilled in the art that once cross couple 380 has been set by the DEFROST SET pulse and an E(60) pulse has gated transistors 391, the output of NORgate 382 will be a logic 1 and the output of NORgate 388 will be a logic 0. Thus, the output of gate 390 will be a logic 0. However, it can be seen that the cross couple 380 will be held reset by a TIMER signal, or a RESET . CA1 pulse or a logic 1 output from gate 392. Since output of gate 388 is coupled back to the input of gate 392 it can be seen that as soon as the $\overline{\mu\lambda = 0.CA1}$ signal goes to a logic 0, gate 392 will reset cross couple 380. A $\overline{\mu\lambda = 0}$ signal, produced by the ALU section when the microwave downcount is zero, and $\overline{CA1}$ are applied to a gate 394, the output of which is labeled $\overline{\mu\lambda = 0.CA1}$. The output of gate 394 is inverted by an inverter 396, the output of which is labeled $\mu\lambda = O.CA1$ and which is applied to the input of gate 392. Thus it can be seen that when the microwave down count reaches zero, gate 392 will reset cross couple 380 and as soon as the next E(60) pulse occurs, cross couple 384 will be reset. Thus, the output of gate 390, labeled $\overline{DEFROST . S\ COOK}$, will go to a logic 1 if cross couple 384 is in the reset condition and the cross couple 372 has been set by a SLOW COOK SET pulse. This $\overline{DEFROST . S\ COOK}$ signal when at the logic 1 level holds cross couple 322 reset so that the TIMER signal is at logic 0. If the DEFROST signal is a logic 1 (cross couple 380 has been set by a DEFROST SET pulse) and a number is subsequently entered into the system, the NUM CC STROBE signal will go to logic 1, and the output of AND gate 398 will go to a logic 1. Cross couple 400 will thus be set and line 402 will go to a logic 1. The logic 1 on line 402 and the logic 1 at the output of gate 392 are applied to AND gate 404, the output of which sets cross couple 406 comprising NORgates 408 and 410. The output of cross couple 406 is applied to a cross couple 412 comprised of NORgates 414 and 416 via transistors 418 which are gated by E(60). Thus, when AND gate 404 goes to a logic 1, cross couple 406 will be set so that line 407 (the output of gate 408) goes to a logic 1 and the output of gate 410 goes to a logic 0. When the next E(60) pulse occurs, the output of gates 408 and 410 are applied to gates 414 and 416 so that the output of NORgate 416 goes to a logic 1. The output of gate 416 on line 418 is applied to AND gates 420 and 422. If the microwave down count is zero ($\mu\lambda = 0.CA1 = 1$) the output of gates 420 and 422 will go to logic 1, if the output of gate 416 is a logic 1. Gate 420 will reset cross couple 406 and gate 422 will set cross couple 424 comprised of NORgates 426 and 428 so that the output of gate 426 on line 430 goes to a logic 1. The output of cross couple 424 is applied to the input of cross couple 432 comprised of NORgates 434 and 436 via transistors 438 which are gated by E(60). Thus, when cross couple 424 is set by gate 422, it can be seen that the output of NORgate 436 will go to a logic 1 after an E(60) pulse has occurred, and the output of AND gate 440 will thereafter go to a logic 1 when $\mu\lambda = 0.CA1$ goes to a logic 1. When this occurs, cross couple 424 will be reset by AND gate 440.

The output of gates 382 and 388 is applied to NAND gate 422 and AND gate 444 such that the output of NAND gate 442 goes to a logic 0 when both inputs are a logic 1 and the output of AND gate 444 goes to a logic 1 when both inputs are logic 1. It can be seen that the output of both gates 382 and 388 is a logic 1 only when cross couple 384 is reset so that the output of gate 388 goes to a logic 1. Subsequently, when cross couple 380 is set by a DEFROST SET pulse, it will be seen that the output of NORgate 382 will go to logic 1, and the output of gate 388 will remain at a logic 1 level until the next E(60) pulse occurs. Thus, the output of gates 442 and 444 will go to a logic 0 and 1, respectively, for an interval of time which is less than one line cycle. The output of NAND gate 442 is applied to the input of a gate 446, the output of which goes to a logic 1, only during the next CA2 pulse following the DEFROST SET pulse. In a manner similar to gate 444, it will be seen that the output of AND gates 448 and 450 will go to a logic 1 only for a time interval of less than one line cycle. The output of NORgate 378 is applied to AND gate 452, the other input of which is the START O.T. pulse. It can be seen that the output of AND gate 452 will go to a logic 1 only when cross couple 380 has been reset by a logic 1 at any of the inputs to NORgate 382 and when the START O.T. pulse is a logic 1. The outputs of AND gates 450, 448, 444, 452 and the TIMER O.T. pulse are applied to a NORgate 454, the output of which is a logic 0 whenever any of its inputs are a logic 1. The output of NORgate 454 is applied to a gate 456 along with $\overline{CA1}$ such that the output of gate 456 is a logic 1 whenever both inputs are a logic 0.

One of the outputs of matrix encoder 350, labeled INHIBIT DISPLAY is inverted and applied to gates 458, 460 and 462. The DISABLE KEYBOARD signal is applied to gates 462, 460 and is inverted and applied to gate 458. In addition, the A NUM PUSH signal is applied to gate 460. Thus, the output of gate 462, labeled TIME DISPLAY, goes to a logic 1 when a number has not been entered into the system (A NUM PUSH = 0), the display is not to be inhibited ($\overline{INHIBIT\ DISPLAY} = 1$) and the keyboard is not disabled (DISABLE KYBD = 0). Further, the output of gate 460, labeled DISPLAY INPUT, will go to a logic 1 when a number has been entered into the system ($\overline{A\ NUM\ PUSH} = 0$), the display is not to be inhibited ($\overline{INHIBIT\ DISPLAY} = 1$), and the keyboard is not disabled (DISABLE KYBD = 0). Finally, it can be seen that the output of gate 458, labeled TIMER MODE, is a logic 1 when the display is not to be inhibited ($\overline{INHIBIT\ DISPLAY} = 1$) and when the keyboard is to be disabled (DISABLE KYBD = 1).

The matrix encoder 350 takes the various information from the control logic section such as the output of gate 456 on line 464, the output of gate 446 on line 466, the RESET . CA2 signal, the RESET.CA1 signal, the CLOCK SET. CA1 signal, the TIME DISPLAY signal, the DISPLAY INPUT signal, the TIMER MODE signal, the READ IN signal, and the No. 1 RESET signal and produces the outputs labeled INHIBIT DISPLAY, CODE 1, CODE 2, and CODE 3. In the matrix encoder 350 a circle at the intersection of an input line with an output line represents a transistor to ground. Thus, if an input line is at a logic 1, any output line that has a circle at its intersection with that input line will be at ground or logic 0.

Referring now to FIG. 12D, the $\overline{\text{START}}$ signal, the $\overline{\text{DEFROST}}$ signal, the signal on lines 407 and 418 are applied to a gate 468, the output of which is labeled COOK TIME. The COOK TIME signal is a logic 1 if all the inputs to gate 468 are a logic 0. Inputs T, DEFROST, the signal on line 407, the $\overline{\mu\lambda=0.\text{CA1}}$ signal, and the signal on line 430 are applied to a gate 470, the output of which is labeled $\mu\lambda=0$ STROBE. The output of gate 470 goes to a logic 1 when its inputs fall to a logic 0.

Referring now to FIG. 12F, the output circuits of the control logic section are shown. The output line 46, which controls current flow in the primary winding 36 of high voltage transformer (FIG. 1) is connected to ground when a logic is applied to the gate of transistor 472. Thus, the high voltage transformer will be energized whenever a logic 1 is applied to the gate of transistor 472. A NORgate 474 and an inverter 476, the output of which gates transistor 472, essentially form an OR gate so that a logic 1 at any input to NORGATE 474 turns on transistor 472. Thus, the three AND gates 478, 480, and 482 the outputs of which are applied to the inputs of NORgate 474 will gate the transistor 472 when the output of any one of them goes to a logic 1. The COOK TIME signal and the SLOW COOK signal are applied to a NAND gate 484, which output is labeled $\overline{\text{COOK TIME.S COOK}}$. The output of NAND gate 484 also inverted by an inverter 486, the output of which is COOK TIME.S COOK. It can be seen that the output of AND gate 478 will go to a logic 1 whenever COOK TIME = 1 and S.COOK = 0. Referring to AND gate 480, it can be seen that the output thereof will go to a logic 1 whenever COOK TIME = 1, SLOW COOK = 1, and 50%/33% = 1. Finally referring to AND gate 482, it can be seen that the output thereof will go to a logic 1 when 50%/33% = 1, DEFROST = 1, and START = 1.

The transistors 488 and 490 control the logic state of the two lines leading to switching circuit (FIG. 1) which controls the indicators 70. It will be seen that transistors 488 will be gated when any one of the inputs to NORgate 293, the output of which is inverted by inverter 494, is a logic 1. Thus it can be seen that transistor 488 will be gated whenever CLOCK DISABLE = 1 or when the output of AND gate 496 = 1 or when the output of AND gate 298 = 1. It can further be seen that the output of AND gate 496 will go to a logic 1 when $\overline{\text{COOK TIME.S COOK}}$ = 1 and COOK TIME = 1 and PAGE 1 = 1. Also, the output of AND gate 498 will go to a logic 1 whenever PAGE 2 = 1 and line 407 = 1. Transistor 490 will be gated by the output of inverter 500 which inverts the output of NORgate 502. It will be seen that transistor 490 will be gated when any one of the inputs to NORgate 502 is a logic 1. Thus, whenever CLOCK DISABLE = 1, or the output of any one of AND gates 504, 506, 508 and 510 is a logic 1, transistor 490 will be gated. It will be seen that the output of AND gate 504 will be a logic 1 when S COOK = 1 and PAGE 2 = 1 and START = 1; The output of AND gate 506 will be a logic 1 when COOK TIME 1 and S COOK = 1 and PAGE 1 = 1; and the output of AND gate 510 will be a logic 1 when TIMER = 1 and PAGE 3 = 1.

Still referring to FIG. 12F the voltage level of line 114 to the BUZZER POWER CIRCUIT 76 (FIG. 1) is controlled by a transistor 512 which is gated by the output of gate 514. The inputs to gate 514 include a BUZZER signal generated by the main ROM addressing which oscillates between the logic 1 and logic 0 levels. The $\mu\lambda = 0$ STROBE and the COOK TIME signals are applied to AND gate 516, the ouput of which is applied to cross couple 520. The $\mu\lambda = 0$ STROBE and the TIMER signals are applied to AND gate 518, the output of which is also applied to cross couple 520. The output of cross couple 520 is applied to a NORgate 522 and gate 524 such that a logical 1 input from either gate 516 or 518 sets cross couple 520, bringing the output to a logic 0. As soon as the BUZZER signal falls to a logic 0 after cross couple 520 has been set, it can be seen tht transistor 512 will be gated by the output of gate 514. It can be also seen that as the BUZZER signal oscillates between logic 1 and 0, the transistor 512 will switch between logic 1 and 0, the transistor 512 will be turned on and off to provide the oscillating signal for the BUZZER 74 (FIG. 1) which may be a piezoelectric crystal, for example. The output of NORgate 522 is applied to a delay flip flop 524 which is clocked by the signal labeled 1 SEC. The 1 SEC signal is a pulse that occurs every second which is generated in the A.L.U. section. Assuming the Q output of flip flop 524 is a logic 0, the output of gate 522 will go to a logic 1 when cross couple 520 is set by the output of either gate 516 or 518 going to a logic 1. When the next 1 SEC pulse occurs, the Q output of delay flip flop 524 will go to a logic 1 which will render transistor 526 conductive and return the output of NORgate 522 to a logic 0. The next 1 SEC pulse will be conducted by transistor 526 to reset cross couple 520 so that the output thereof goes to a logic 1, thus maintaining the output of NOR gate 522 at the logic 0 level until cross couple 520 is set again.

CONTROL CODE COMPARATOR, INSTRUCTION DECODE LOGIC A.L.U. CONTROL ROM AND ARITHMETIC LOGIC UNIT

Referring to FIG. 13, a schematic diagram of the control code comparator in accordance with the present invention is shown. The control code from the CONTROL LOGIC 102 on lines 124 is compared with the control code from the ROM 104, and if the two control codes compare, the line labeled $\overline{\text{INST ENABLE}}$ goes to a logic 0. In order for the $\overline{\text{INST ENABLE}}$ line, which is normally at logic 1, to be pulled to ground (logic 0), it can be seen transistor 528, 530 and 532 must all be rendered conductive, thus effectively connecting the $\overline{\text{INST ENABLE}}$ line to ground. Each of the transistors 528, 530 and 532 is rendered conductive in response to one of lines 124 and a corresponding one of lines 134 being at the same logic state. The $\overline{\text{INST ENABLE}}$ line can also be pulled to a logic 0, if all three transistors 534, 536 and 538 are rendered conductive as a result of a logic 1 state on lines 134. Thus, it can be seen that the $\overline{\text{INST ENABLE}}$ line will go to a logic 0 whenever the logic state of lines 124 is the same as the logic state of lines 134 or when all three lines 134 are at a logic 1 state.

As was stated above, each control code represents a certain group of instructions which is to be carried out by the A.L.U. Some of the eighty ROM words relate, for instance, to setting the time of day clock and the ALU will not carry out the instructions stored in the ROM relating to the CLOCK SET until the CONTROL LOGIC produces the CLOCK SET control code. After the CONTROL LOGIC generates the control code relating to CLOCK SET, any ROM words containing the CLOCK SET control code will be executed by the A.L.U.

The eight CONTROL CODES are listed below in the table labeled CONTROL CODES and the purpose of each is briefly described below. As was discussed above in connection with the CONTROL CODE COMPARATOR, a DO NOT INHIBIT CONTROL CODE (111) from the ROM 104 brings the INST ENABLE line to a logic 0 so that any ROM words containing the DO NOT INHIBIT control code will be executed regardless of CONTROL CODE from the CONTROL LOGIC section. The TIME DISPLAY control code allows instructions related to displaying the time of day to be carrried out. Under the TIMER MODE control code, instructions relating to updating the timer down count in both the TIMER mode and the MICROWAVE mode are carried out. In the READ In MODE, instructions are carried out which allow the user to enter information into the control. The TIMER SET control code allows instructions to be carried out which transfer the information entered under the READ IN MODE into the proper RAM word relating to the TIMER. The CLOCK SET control code transfers information which has been read in, to the proper RAM word which stores the TIME OF DAY. In the RESET control code, the BCD RAM word which represents the information entered into the control is set to a zero. And, finally, under the DISPLAY INPUT control code, infomation which has been entered into the control and which is stored in the BCD RAM word relating to the entered information, instructions are carried out which displays the entered information.

| Instruction Mnemonic | CONTROL CODES Binary Number | No. |
|---|---|---|
| DO NOT INHIBIT | 111 | 1 |
| TIME DISPLAY | 011 | 2 |
| TIMER MODE | 101 | 3 |
| READ IN MODE | 000 | 4 |
| TIMER SET | 110 | 5 |
| CLOCK SET | 010 | 6 |
| RESET | 100 | 7 |
| DISPLAY INPUT | 001 | 8 |

The description of the INSTRUCTION DECODE logic 136, the ALU CONTROL ROM, and the ARITHMETIC LOGIC UNIT will be made in conjunction with the following tables which set out, respectively, the nineteen different INSTRUCTION CODES, the instruction performed thereby, and the program which the main ROM 104 represents.

| INSTRUCTION MNEMONIC | BINARY NO. | INSTRUCTION CODES DESCRIPTION OF INSTRUCTION |
|---|---|---|
| SET NON | 11011 | SET ZERO INTO 10 HOUR OF TIME OF DAY IF TIME OF DAY = 13 O'CLOCK |
| SET ONE | 01000 | SET BCD "1" INTO 1 HOUR OF TIME CF DAY IF TIME OF DAY = 13 O'CLOCK |
| SET SEC | 00100 | SET MICROWAVE UPDATE LATCH IF CARRY FLIP FLOP = 1 (ONE SECOND COUNTER) |
| SET TEN | 10100 | TOGGLE DEFROST/LOW POWER COUNTER IF CARRY FLIP FLOP = 1 (10 SECOND COUNTER) |
| μλCHK | 01010 | CHECK TO SEE IF MICROWAVE NO. IN RAM = 0 |
| END ROM | 11100 | SEND CONTROL SIGNAL TO CONTROL LOGIC TO SYNCHRONIZE CONTROL CODES |
| LOA MEM | 01010 | TRANSFER NUMBER IN ALU LATCH TO DATA BUSS AND THEN INTO PROPER RAM LOCATION |
| INS MEM | 11010 | TRANSFER NUMBER IN INPUT DATA LATCH TO DATA BUSS AND THEN INTO PROPER RAM LOCATION |
| SET ZRO | 00110 | SET "0" INTO RAM LOCATION MENTIONED IN ROM WORD |
| ADD TEN | 00001 | ADD "1" TO RAM WORD AND STORE IN ALU LATCH (1,2,3,4,5,6,7,8,9,0) |
| ADD SIX | 10001 | ADD "1" TO RAM WORD AND STORE IN ALU LATCH (1,2,3,4,5,0) |
| ADD FIVE | | ADD "1" TO RAM WORD AND STORE IN ALU LATCH (1,2,3,4,0) |
| SUB TEN | 11001 | SUBTRACT "1" FROM RAM WORD AND STORE IN ALU LATCH (9,8,7,6,5,4,3,2,1,0) |
| SUB SIX | 00101 | SUBTRACT "1" FROM RAM WORD AND STORE IN ALU LATCH (5,4,3,2,1,0) |
| HLD ALU | 01100 | TRANSFER RAM WORD TO ALU LATCH |
| DET ONE | 00011 | DETECT A BCD "1" IN RAM WORD (FOR 13 O'CLOCK) |
| DET TRI | 10011 | DETECT A BCD "3" IN RAM WORD (FOR 13 O'CLOCK) |
| DET ZRO | 01011 | DETECT A BCD "0" IN RAM WORD |
| DPY BIT | 00111 | TRANSFER RAM WORD TO BCD OUTPUT LATCH |
| NO OP | 01101 | NO OPERATION PERFORMED |

| ROM ADDRESS | PAGE | CONTROL CODE | ROM PROGRAM INSTRUCTION MNEMONIC | RAM WORD | BINARY WORD ADDRESS | BINARY DIGIT ADDRESS |
|---|---|---|---|---|---|---|
| 0 | 1 | 2 | DPY BIT | 10 | 10 | 01 |
| 1 | 1 | 3 | DPY BIT | 11 | 11 | 01 |
| 2 | 1 | 8 | DPY BIT | 9 | 01 | 01 |
| 3 | 1 | 1 | ADD TEN | 0 | 00 | 00 |
| 4 | 1 | 1 | LOA MEM | 0 | 00 | 00 |
| 6 | 1 | 1 | ADD SIX | 4 | 00 | 10 |
| 6 | 1 | 1 | LOA MEM | 4 | 00 | 10 |
| 7 | 1 | 1 | SET SEC | 4 | 00 | 10 |
| 8 | 1 | 1 | ADD TEN | 12 | 00 | 11 |
| 9 | 1 | 1 | LOA MEM | 12 | 00 | 11 |
| 10 | 1 | 1 | SET TEN | 12 | 00 | 11 |
| 11 | 1 | 1 | ADD SIX | 8 | 00 | 01 |
| 12 | 1 | 1 | LOA MEM | 8 | 00 | 01 |
| 13 | 1 | 1 | ADD TEN | 2 | 10 | 00 |

-continued

| ROM ADDRESS | PAGE | CONTROL CODE | ROM PROGRAM INSTRUCTION MNEMONIC | RAM WORD | BINARY WORD ADDRESS | BINARY DIGIT ADDRESS |
|---|---|---|---|---|---|---|
| 14 | 1 | 1 | LOA MEM | 2 | 10 | 00 |
| 15 | 1 | 1 | ADD SIX | 6 | 10 | 10 |
| 16 | 1 | 1 | LOA MEM | 6 | 10 | 10 |
| 17 | 1 | 1 | ADD TEN | 14 | 10 | 11 |
| 18 | 1 | 1 | LOA MEM | 14 | 10 | 11 |
| 19 | 1 | 1 | ADD SIX | 10 | 10 | 01 |
| 0 | 2 | 2 | DPY BIT | 14 | 10 | 11 |
| 1 | 2 | 3 | DPY BIT | 15 | 11 | 11 |
| 2 | 2 | 8 | DPY BIT | 13 | 01 | 11 |
| 3 | 2 | 1 | LOA MEM | 10 | 10 | 01 |
| 4 | 2 | 1 | DET ONE | 10 | 10 | 01 |
| 5 | 2 | 1 | DET TRI | 14 | 10 | 11 |
| 6 | 2 | 1 | SET NON | 10 | 10 | 01 |
| 7 | 2 | 1 | SET ONE | 14 | 10 | 11 |
| 8 | 2 | 3 | DET ZRO | 3 | 11 | 00 |
| 9 | 2 | 3 | DET ZRO 7 | 11 | 10 | |
| 10 | 2 | 3 | DET ZRO | 15 | 11 | 11 |
| 11 | 2 | 3 | DET ZRO | 11 | 11 | 01 |
| 12 | 2 | 3 | μλCHK | 11 | 11 | 01 |
| 13 | 2 | 3 | SUB TEN | 3 | 11 | 00 |
| 14 | 2 | 3 | LOA MEM | 3 | 11 | 00 |
| 15 | 2 | 3 | SUB SIX | 7 | 11 | 10 |
| 16 | 2 | 3 | LOA MEM | 7 | 11 | 10 |
| 17 | 2 | 3 | SUB TEN | 15 | 11 | 11 |
| 18 | 2 | 3 | LOA MEM | 15 | 11 | 11 |
| 19 | 2 | 3 | SUB SIX | 11 | 11 | 01 |
| 0 | 3 | 2 | DPY BIT | 6 | 10 | 10 |
| 1 | 3 | 3 | DPY BIT | 7 | 11 | 10 |
| 2 | 3 | 8 | DPY BIT | 5 | 01 | 10 |
| 3 | 3 | 3 | LOA MEM | 11 | 11 | 01 |
| 4 | 3 | 4 | HLD ALU | 13 | 01 | 11 |
| 5 | 3 | 4 | LOA MEM | 9 | 01 | 01 |
| 6 | 3 | 4 | HLD ALU | 5 | 01 | 10 |
| 7 | 3 | 4 | LOA MEM | 13 | 01 | 11 |
| 8 | 3 | 4 | HLD ALU | 1 | 01 | 00 |
| 9 | 3 | 4 | LOA MEM | 5 | 01 | 10 |
| 10 | 3 | 4 | INS MEM | 1 | 01 | 00 |
| 11 | 3 | 5 | HLD ALU | 9 | 01 | 01 |
| 12 | 3 | 5 | LOA MEM | 11 | 11 | 01 |
| 13 | 3 | 5 | HLD ALU | 13 | 01 | 11 |
| 14 | 3 | 5 | LOA MEM | 15 | 11 | 11 |
| 15 | 3 | 5 | HLD ALU | 5 | 01 | 10 |
| 16 | 3 | 5 | LOA MEM | 7 | 11 | 10 |
| 17 | 3 | 1 | NO OP | 1 | 01 | 00 |
| 18 | 3 | 5 | HLD ALU | 1 | 01 | 10 |
| 19 | 3 | 5 | LOA MEM | 3 | 11 | 00 |
| 0 | 4 | 2 | DPY BIT | 2 | 10 | 00 |
| 1 | 4 | 3 | DPY BIT | 3 | 11 | 00 |
| 2 | 4 | 8 | DPY BIT | 1 | 01 | 00 |
| 3 | 4 | 6 | HLD ALU | 9 | 01 | 01 |
| 4 | 4 | 6 | LOA MEM | 10 | 10 | 01 |
| 5 | 4 | 6 | HLD ALU | 13 | 01 | 11 |
| 6 | 4 | 6 | LOA MEM | 14 | 10 | 11 |
| 7 | 4 | 6 | HLD ALU | 5 | 01 | 10 |
| 8 | 4 | 6 | LOA MEM | 6 | 10 | 10 |
| 9 | 4 | 6 | HLD ALU | 1 | 01 | 00 |
| 10 | 4 | 6 | LOA MEM | 2 | 10 | 00 |
| 11 | 4 | 6 | SET ZRO | 0 | 00 | 00 |
| 12 | 4 | 6 | SET ZRO | 4 | 00 | 10 |
| 13 | 4 | 6 | SET ZRO | 12 | 00 | 11 |
| 14 | 4 | 6 | SET SRO | 8 | 00 | 01 |
| 15 | 4 | 7 | SET ZRO | 9 | 01 | 01 |
| 16 | 4 | 7 | SET ZRO | 13 | 01 | 11 |
| 17 | 4 | 7 | SET ZR0 | 5 | 01 | 10 |
| 18 | 4 | 7 | SET ZRO | 1 | 01 | 00 |
| 19 | 4 | 1 | END ROM | 1 | 01 | 00 |

Referring now to the above table which sets out the ROM PROGRAM, it will be noted that at ADDRESS 0, 1 and 2, of each page, a particular RAM word is displayed, if the control codes from the CONTROL LOGIC SECTION and ROM 104 compare. Normally, if no information has been entered into the control, the CONTROL LOGIC SECTION 102 will output CONTROL CODE 2. Thus, at PAGE 1, ADDRESS 0, RAM word 10 will be displayed, at PAGE 2, ADDRESS 0, RAM word 14 will be displayed, at PAGE 3, ADDRESS 0, RAM word 6 will be displayed, and at PAGE 4, ADDRESS 0, RAM word 2 will be displayed. The displays are multiplexed by a multiplexing circuit as is well known in the art and since the ROM is cycled through its eighty words at such a high rate of speed, the blinking of the displays is not perceived by the human eye to which the display appears to glow constantly. In the event, however, that the CONTROL LOGIC outputs a No. 3 or a No. 8 CONTROL CODE, it can be seen that the μλ TIMER down count or the KEYBOARD information, respectively, will be displayed.

Referring still to the ROM PROGRAM, and particularly to PAGE 1, ADDRESSES 3 through 19 and ADDRESSES 3 through 7 of PAGE 2, it will be seen that this section of the program updates the information in the 60 HZ and TIME OF DAY words. The 60 HZ and TIME OF DAY words are updated or not updated dependent upon a carry being noted in the update of the previous word. Each line cycle, the ALU adds 1 to 1/60 SEC word and loads the updated word back into the proper RAM location. If a carry signal has been noted, the ALU continues updating 60 HZ and TIME OF DAY words. If a carry signal has not been noted, however, the ALU will not continue to update these words. The 1 HR and 10 HR words are checked (DET ONE and DET TRI) to determine whether 13 O'CLOCK has yet been reached. If a 13 O'CLOCK is detected, the 10 HR word is set to zero (SET NON) and the 1 HR word is set to a one (SET ONE) so that 1 0'CLOCK is stored in the BCD TIME OF DAY word.

If the CONTROL LOGIC generates a No. 3 CONTROL CODE (TIMER MODE), the ALU first checks to see if the number stored in each TIMER BCD word is 0000. If this check proves positive, on the $\mu\lambda$ CHK operation, the $\mu\lambda = 0$ signal goes to a logic 0 and the CONTROL LOGIC actuates the buzzer to indicate to the user that the timed interval has elapsed. The CONTROL LOGIC section 102 also deactivates the high voltage transformer if the $\mu\lambda$ TIMER has counted down to zero. In the event the $\mu\lambda$ TIMER BCD word is not yet zero, a 1 is subtracted from the $\mu\lambda$ TIMER NUMBER every one second and loaded back into the proper RAM location until the BCD TIMER word has been decremented to a zero.

When a user actuates a number touch swich, the CONTROL LOGIC section 102 will generate the READ IN (No. 4) control code only for one complete ROM cycle. During this ROM cycle, RAM word 13 will be transferred into the ALU latch and loaded back into RAM word 9, RAM word 5 will be transferred into the ALU latch and loaded back into RAM word 13, RAM word 1 will be transferred into the ALU latch and loaded back into RAM word 5, and the number in the input data latch will be loaded into RAM word 1.

When a user actuates the TIMER SET touch switch or actuates the START switch, or when the control system switches from the DEFROST to a HOLD mode or from a HOLD mode into a COOK or SLOW COOK mode, the CONTROL LOGIC section 102 generates the control code No. 5 (TIMER SET). When the ROM cycles to PAGE 3, ADDRESS 11, instructions relating to the TIMER SET control code will be executed by the ALU. The ROM instructions see to it; that RAM word 9 is transferred into the ALU latch and loaded back into RAM word 11; that RAM word 13 is transferred into the ALU latch and loaded back into RAM word 15; that RAM word 5 is transferred into the ALU latch and loaded back into RAM word 7; and that RAM word 1 transferred into the ALU latch and loaded back into RAM word 3. Thus, the group of instructions relating to the TIMER SET control code essentially transfers the KEYBOARD BCD word into the $\mu\lambda$ TIMER BCD word.

Instructions relating to the CLOCK SET CONTROL CODE essentially transfer the BCD KEYBOARD word into the BCD TIME OF DAY word. The CLOCK SET instructions also set the BCD 60 HZ word to a zero.

Finally, the ROM instructions relating to the RESET control code (No. 7) see to it that the BCD KEYBOARD word is set to zero.

Referring now to FIGS. 14A and 14B, the instruction code from the ROM 104 on lines 138 is inverted, and the instruction code and the inverted instruction code are applied to the INSTRUCTION DECODE ROM 136. The INSTRUCTION DECODE ROM 136 includes a plurality output of lines, and a plurality of input lines. The input lines include: the five bit INSTRUCTION CODE on line 138 and the inverted INSTRUCTION CODE; the $\overline{\text{INST ENABLE}}$ signal on line 540 which pulls all horizontal lines to ground when INST ENABLE = 1 (control codes from CONTROL LOGIC and ROM 104 do not compare, nor does the control code from the ROM 104 = 111), the $\overline{\text{INST ENABLE}}$ signal on line 542 which pulls line 544 to ground when INST ENABLE = 1, the $\overline{\phi_3 \rightarrow \phi_4}$ signal (FIG. 10), the $\overline{\phi_4}$ signal on lines 546 and 548, the $\overline{\phi_3}$ signal, the $\overline{Q}$ output of flip flop 550 on line 552, and the 13 O'CLOCK signal on line 553.

The output lines of the INSTRUCTION DECODE LOGIC 136 include: line 544, line 556 which goes to a logic 1 on the SET NON instructions, line 558 which goes to a logic 1 on the SET ZRO instructions, line 560 which goes to a logic 1 on the LOA MEM instructions, the line labeled SET ONE, the ADD FIVE line, the SUB SIX line, the SUB TEN line, the ADD SIX line, the DPY. $\phi_3$ line, the DPY. $\phi_4$ line, the INS MEM line 562, the END ROM line (EOR), the $\mu\lambda$ CHK line, the SET TEN line which is inverted to provide $\overline{\text{SET TEN}}$, the SET SEC line which is inverted $\overline{\text{SET SEC}}$, the DET ZRO line which is inverted to provide $\overline{\text{DET ZRO}}$, the DET TRI line which is inverted to provide $\overline{\text{DET TRI}}$, the DET ONE line which is inverted to provide $\overline{\text{DET ONE}}$, line 554, line 555, line 557, line 563 which goes to a logic 1 on the DPY BIT instructions, line 564, line 566, and line 568.

Referring to FIG. 14A, the binary number on the DATA BUSS comprised of lines 570, 572, 574, and 576, is applied to the ALU CONTROL ROM 141 on lines 578, 580, 582 and 584. The signal on lines 578, 580, 582, and 584 are inverted by inverters 586, 588, 590, and 592 and applied to the ROM 141 on lines 594, 596, 598, and 600. The signal on lines 594, 596, 598 and 600 is transferred to a BUS comprised of lines 602, 604, 606 and 608 via transistors 609 which are gated by the signal on line 544 from DECODE LOGIC 136. The ALU CONTROL ROM includes a plurality of horizontal lines 610, 612, 614, 616, 618, 620, 622, 624, 626, 628, 630, 632, 634 and 636. With line 576 of the DATA BUSS representing the most significant digit and with each of the circles in FIG. 14A representing a transistor to ground, it will be seen that the binary representation of a decimal 9 on the DATA BUSS will pull all of the horizontal lines to ground except line 636 which remains at a logic 1. In a similar manner, a decimal 8 on the DATA BUSS leaves line 634 at logic 1, a decimal 7 on the DATA BUSS leaves line 632 at logic 1, a decimal 6 on the DATA BUSS leaves line 630 at logic 1, a decimal 5 on the DATA BUSS leaves lines 628 and 619 at logic 1, a decimal 4 on the DATA BUSS leaves lines 626 and 625 at logic 1, a decimal 3 on the DATA BUSS leaves line 622 at logic 1, a decimal 2 on the DATA BUSS leaves line 620 at logic 1, a decimal 1 on the DATA BUSS leaves line 618 at logic 1, and a decimal 0 on the DATA BUSS leaves lines 616, 614 and 612 at logic 0. It will also be seen that a logic 1 on the ADD FIVE line will pull line 624 to logic 0, a logic 1 on the SUB SIX line pulls line 616 to logic 0, a logic 1 on the SUB TEN line pulls line 614 to logic 0, and a logic 1 on the ADD SIX line pulls line 628 to logic 0.

The ALU CONTROL ROM 141 adds or subtracts 1 to the number on the DATA BUSS, depending upon the instructions from the DECODE LOGIC. Lines 638, 640, 642 and 644, collectively labeled ADD, detect which of the horizontal lines is at logic 1 and the logic state of these lines goes to the logical complement of the number on the DATA BUSS plus one. For example, if the decimal number on the DATA BUSS is 2 (binary 0010), it will be seen that line 620 will be at logic 1 and the logic state of lines 638, 640, 642 and 644 will go to 1100, respectively, which is the logical complement of 0011 (decimal 3). The subtraction process acts in a similar manner so that lines 646, 648, 650, and 652, collectively designated SUB, go to the logical complement of number on the DATA BUSS minus 1. The information on the ADD lines 638, 640, 642 and 644 is passed to lines 608, 606, 604 and 602 by transistors 654 which are gated by line 656. Also, the information on the SUBTRACT lines 646, 648, 650 and 652 is passed to lines 608, 606, 604 and 602 by transistors 658 which are gated by the signal on line 660.

The signal on line 608 is applied to a resetable latched inverter 662, the signal on line 606 is applied to a resetable latched inverter 664, the signal on line 604 is applied to a resetable latched inverter 666, and the signal on line 602 is applied to resetable latched inverter 668. The resetable latched inverters 662, 664, 666, and 668 are identical and are schematically shown within the dotted line 668. It can be seen that a logic 1 on the $\overline{Q}$ input brings the Q output to logic 0 and latches it in that condition. If a logic 1 is applied to the R input, the Q output goes to a logic 0 and remains in that state. The Q output of each of resetable latched inverters 662, 664, 666 and 668 is applied to the input of NOR gates 670, 672, 674 and 676, respectively. The other input to gates 670, 672, 674 and 676 is the $\overline{\text{LOAD MEM}}$ signal and the third input to gate 676 is the SET ONE signal. The output of gates 670, 672, 674 and 676 is applied to the gate of transistors 678, 680, 682 and 684, respectively, which pull the respective line of the DATA BUSS to logic 0, if gated. Thus, to return to the earlier example, if the DATA BUSS had a decimal 2 on it and a 1 was added to it, lines 638, 640, 642 and 644 will be at 1100, respectively. Transistors 654 will be gated bringing lines 608, 606, 604 and 602, respectively, to 1100. Thus, the Q output of resetable latched inverters 662, 664, 666 and 668 will be, respectively, 0011. On the LOA MEM instruction from the ROM 104, the LOAD MEM signal will be at logic 1 and the SET ONE signal will be at logic 0. Thus the outputs of gates 670, 672, 674 and 676 will be at 1100 and transistors 678 and 680 will be gated, thus pulling lines 574 and 576 to ground. Therefore, it can be seen that the binary number on the DATA BUSS represents a decimal 3. In addition, it will be seen that on the SET NON instructions, line 555 will be at logic 1, thus resetting the Q outputs of 662, 664, 666 and 668 to 0 to load a zero on the DATA BUSS on the LOA MEM instruction.

The ADD and sub lines will add and subtract one from the number on the DATA BUSS regardless of what number it is. In order to insure that the 1/6 SEC, 10 SEC, and 10 MIN words in the 60 HZ BCD and TIME OF DAY BCD words only count up to five, whenever the ADD six line goes to logic 1, line 628 will be pulled to ground. Thus, if a decimal five is on the DATA BUSS, a 0 will be put back on the DATA BUSS during the next LOA MEM instruction. The SUB TEN and SUB SIX lines whenever equal to a logic 1 pull lines 614 and 616, respectively, to ground in order to ensure that whenever a 1 is subtracted from a 0, a nine is obtained in the SUB TEN instruction, and to ensure that when a 1 is subtracted from a 0, a 5 is obtained in the SUB SIX instruction. Also, the ADD FIVE line, when at the logic 1 level, pulls line 624 to ground so that when a 1 is added to a 4, a 0 is obtained in the ADD FIVE instructions.

Transistors 658 are gated by a logic 1 signal on line 660. The logic state of line 660 is controlled by a NOR gate 686. It will be seen that line 568 will go to a logic 0 only when the SUB SIX and SUB TEN lines go to a logic 1. Therefore, the output of gate 686 will go to a logic 1 only when either the SUB SIX or SUB TEN lines is at logic 1 and the $\overline{\phi}_4$ signal is at logic 0. It can be seen in a similar manner that transistors 654 will be gated by a logic 1 signal on line 656 from gate 688 only when $\phi_4$ is a logic 0 and line 566 is at logic 0. Since line 566 goes to a logic 0 only when either of the ADD SIX, ADD FIVE or ADD TEN lines are at logic 0, transistors 654 are gated only during ADD SIX, ADD FIVE or ADD TEN instructions.

The signal on the SUB SIX line and the signal on line 612 are applied to NAND gate 690 so that the output of NAND gate 690 goes to a logic 0 when SUB SIX = 1 and the signal on line 612 is at a logic 1 (indicating the number on the DATA BUSS is a decimal 0). Since the output of NAND gate 690 is connected to the outputs of NAND gates 692, 694, 696 and 698, the input to inverter 700 will be pulled to logic 0 whenever the output of any one of NAND gates 690, 692, 694, 696 and 698 goes to logic 0. Thus, the logic state of the output of NAND gates 690, 692, 694, 696 and 698 is indicative of whether or not a "carry" operation is to be performed on the next most significant digit of the BCD RAM word when it is updated. It can be seen that the output of NAND gate 692 will be a logic 0 if the number on the DATA BUSS is a decimal 0 and SUB TEN = 1, thus indicating that a 0 has been reached for that particular digit in the subtraction routine and the next most significant digit of the BCD RAM word should be decremented by 1 when it is time to update that particular digit. In a similar manner NAND gates 694, 696 and 698 indicate when a carry operation is to be performed on the next most significant digit of that RAM word in the addition routine. For example, gate 694 indicates whether the BCD digit on the DATA BUSS is a decimal 5 and the next most significant digit of the RAM word should be incremented by 1 when it is time to update that particular digit.

The output of inverter 700 is applied to the D input of flip flop 550. The clock signal for flip flop 550 is provided by a NOR gate 702, the inputs of which are $\overline{\phi}_4$ and the signal on line 554. It can be seen that line 554 will go to logic 0 whenever the ADD TEN, or ADD FIVE or ADD SIX, or SUB TEN, or SUB SIX lines are a logic 1. Thus, the flip flop 550 will be clocked during $\phi_4$ when any of these lines go to logic 1. The $\overline{Q}$ output of flip flop 550 is applied to the INSTRUCTION DECODE LOGIC 136 on line 552. It will be seen that when line 552 is at a logic 1, indicating a carry operation is not to be performed, the ADD TEN, ADD FIVE, SUB SIX, SUB TEN, and ADD SIX lines will all go to logic 0. Thus, the output of NAND gates 686 and 688 will remain at logic 0. However line 544 will remain at logic 1 and transistors 610 will be rendered conductive, allowing the logical complement of the binary number on the DATA BUSS to be loaded onto lines 602, 604, 606, and 608. On the next LOA MEM instruction, the binary number which was on the DATA BUSS is simply loaded back into the proper RAM location. Thus, if a carry operation is not to be performed, the BCD digit is simply transferred from the RAM into the ALU latch, back onto the DATA BUSS and loaded back into the RAM. If, however, a carry operation is to be performed the ALU CONTROL ROM 141 is allowed to update the information on the DATA BUSS in accordance with the ROM instructions. The SET (S) input to flip flop 550 on line 704 sets the flip flop 550 so that the $\overline{Q}$ output goes to logic 0.

The inputs to NOR gate 706 include $\overline{\phi}_3$ and the signal on line 564. It can be seen that the output signal of gate 706, labeled RAM PRESET will go to a logic 1 when $\overline{\phi}_3 = 0$ and the signal on line $564 = 0$. It can further be seen that line 564 will be a logic 0 only when line 556, or line 558, or line 562, or line 560 or the SET ONE line go to logic 1. Thus, RAM PRESET goes to a logic 1 during $\overline{\phi}_3$ on the SET NON, SET ZRO, INS MEM, LOA MEM or SET ONE instructions. Thus, as was discussed earlier, the particular RAM cells which are addressed are "SET" to a logic 1 by the RAM PRESET signal. In addition, the RAM PRESET signal is used to "precharge" all lines of the DATA BUSS to a logic 1, as will hereinafter be described.

Once the RAM PRESET signal has gone to a logic 1, it can be seen that line 557 will go to a logic 0, except during the INS MEM instruction, and the output of NOR gate 708, labeled LOAD, will go to a logic 1. This will apply a logic 0 to the inputs of gates 670, 672, 674 and 676 so that transistors 678, 680, 682 and 684 are rendered conductive in accordance with the information on the resetable latched inverters 670, 672, 674 and 676. Thus the lines of the DATA PUSH (which have been precharged to a logic 1) which are to be at logic 0 will be pulled to ground by the proper transistor.

NAND gate 710, the output of which is labeled $\overline{\text{INS MEM}} \cdot \overline{\phi}_3$ will go to a logic 0 when line 562 goes to logic 1 and $\overline{\phi}_3$ goes to a logic 1. The $\overline{\text{INS MEM}} \cdot \overline{\phi}_3$ signal is then used to enable the INPUT DATA LATCH so that the BCD number stored therein is placed on the DATA BUSS, as will hereinafter be described.

Finally, still referring to FIG. 14B, the $\overline{\text{INST ENABLE}}$ line, when at the logic 1 level, will pull all the horizontal lines to logic 0, thus preventing the execution of any of these instructions. In addition whenever the $\overline{\text{INST ENABLE}}$ line is at logic 1, line 544 will be pulled to a logic 0 in order to ensure that transistors 610 are not rendered conductive.

Referring now to FIG. 14C, the signal on line 618 and the $\overline{\text{DET ONE}}$ signal are applied to a NOR gate 716, the output of which is applied to a cross couple 714. The signal on line 622 and the $\overline{\text{DET TRI}}$ signal are applied to a NOR gate 712 which is also applied to cross couple 714, the output of which is labeled $\overline{13 \text{ O'CLOCK}}$. The EOR signal is applied to cross couple 714 to set it at the end of each ROM cycle. It can be $\mu\lambda$ that cross couple 714 will be reset by the output signal of either gate 712 or gate 716 if TIME OF DAY is not 13 O'CLOCK. However, neither gate 712 or gate 716 will reset cross couple 714 if the TIME OF DAY = 13 O'CLOCK, thus maintaining the $\overline{13 \text{ O'CLOCK}}$ signal at logic 0. When the $\overline{13 \text{ O'CLOCK}}$ signal is at logic 0, it will be seen that the SET ONE line and line 556 ($\overline{\text{SET ZRO}}$) are allowed to go to logic 1 on the proper ROM instruction, thus setting the TIME OF DAY to 1 O'CLOCK.

The signal on line 612 and the $\overline{\text{DET ZRO}}$ signal are applied to NOR gate 718, the output of which is applied to cross couple 720, the output of which is labeled ZERO. Cross couple 720 is set by the EOR signal and it will be seen that it will be reset on the DET ZRO instruction if that particular RAM digit is not a zero. Thus, ZERO will be a logic 0 if the RAM digit is not a zero and will remain at a logic 1 on the DET ZRO instruction if the RAM digit is a zero. Referring to the ROM program, it will be seen that all four digits of the $\mu\lambda$ TIMER word are checked to determine whether a 0 is stored therein, and if any one of these digits is anything other than 0, the ZERO signal will be a logic 0.

The $\overline{Q}$ output of flip flop 550 on line 552 and the $\overline{\text{SET SEC}}$ signal are applied to NOR gate 722, the output of which is labeled 1 SEC. Thus, the 1 SEC signal will be a logic 1 if on the SET SEC instruction $\overline{\text{SET SEC}} = 0$, and a carry operation is to be performed (line $552 = 0$). In a similar manner, line 552 and the $\overline{\text{SET TEN}}$ signal are applied to gate 724, the output of which is labeled 10 SEC so that the 10 SEC signal is a logic 1 on the SET TEN instruction when $\overline{\text{SET TEN}} = 0$ and a carry operation is to be performed (line $552 = 0$).

The 1 SEC signal is applied to cross couple 726, the output of which is labeled $\overline{\text{UPDATE}}$ and which is set by the EOR signal. Thus, the $\overline{\text{UPDATE}}$ signal will go to a logic 0 whenever a 1 SEC signal is produced. The $\mu\lambda$ CHK signal and the ZERO signal are applied to NAND gate 728, the output of which is labeled $\overline{\mu\lambda = 0}$. It will be seen that the $\overline{\mu\lambda = 0}$ signal will go to logic 0 when $\mu\lambda$ CHK = 1 and ZERO = 1 (indicating all digits of the $\mu\lambda$ TIMER word are a zero).

The 60 HZ carry signal and the output of a NOR gate 730 are applied to a NOR gate 732, the output of which is inverted by inverter 734. Thus, the output of inverter 734 on line 709 will be a logic 1 whenever either 60 HZ CARRY or the output of gate 730 are at the logic 1 level. A logic 1 on line 709 sets flip flop 550 so that the $\overline{Q}$ output thereof on line 552 goes to a logic 0. It can be seen that the output of gate 730 will go to a logic 1 when the START switch has been depressed or when the TIMER touch switch has been actuated ($\overline{\text{START}} + \overline{\text{TIMER}} = 0$); and when the TIMER word is not a zero (ZERO = 0); and when $\mu\lambda$ CHK = 1); and when $\overline{\text{UPDATE}} = 0$ (a 1 SEC signal has been received). Thus flip flop 550 will be set after every second during the $\mu\lambda$ CHK instruction as long as the $\lambda$ TIMER word is not zero. This updates the $\mu\lambda$ TIMER word every second. The purpose of the 60 HZ signal is to see to it that a 1 is added to the 60 HZ word only once every line cycle. Thus, at CA1 of every line cycle the flip flop 550 will be set at PAGE 1, ADDRESS 2, which allows the information in the 60 HZ and TIME OF DAY words to be updated on that ROM cycle. It will be seen that once the $\overline{Q}$ output of flip flop 550 has gone to a logic 1, it will remain in that logic state until the flip flop 550 is set by a 60 HZ CARRY pulse or a logic 1 at the output of gate 730, indicating that the $\mu\lambda$ TIMER word is to be updated.

INPUT LATCH, TOUCH PAD DRIVER, DISPLAY MULTIPLEX SIGNALS, and OUTPUT LATCH

Referring now to FIG. 15, the input number latch 122 is shown along with the preferred circuitry for loading the contents stored therein onto the DATA BUSS. The INPUT NUMBER LATCH 122 consists of four single bit latches designated by reference numerals 734, 736, 738 and 740. Latches 734-740 are identical and are shown schematically within the dotted lines 740. Each latch 734-740 includes an S input to which one of lines 151 is connected, an L input to which the NUMBER STROBE line is connected, and a Q output which is connected to the input of a gate 742, 744, 746 and 748, respectively. The $R_f$ input to each latch insures that the output thereof is maintained at the proper level until a new input is loaded. Thus, the NUMBER STROBE signal, which occurs at the same instant that the ROM ADDRESS line corresponding to the actuated number switch goes to logic 1, will load the binary equivalent of the actuated number switch into latches 734, 736, 738 and 740. It will be seen that the output of the latches 734, 736, 738 and 740 will be the logical complement of the inputs thereof. However, since the inputs to the latches 734–740 are the logical complements of the binary number representing the ROM ADDRESS, the output of latches 734–740 is the binary number representing the ROM ADDRESS. It will be seen, therefore, that the binary number loaded onto the DATA BUSS when $\overline{\text{INS MEM}}\ \phi_3$ goes to logic 0, is the binary number representing the actuated touch switch.

Referring now to FIG. 16, the PAGE 1, PAGE 2, PAGE 3, and PAGE 4 signals are each applied to an inverter 750, 752, 754 and 756, the outputs of which are applied to NOR gates 758, 760, 762, and 764, respectively. The other input to NOR gates 758–764 is the signal which represents the logical equation: ADDRESS C+ ADDRESS 1 + ADDRESS 2 + ADDRESS 19. Thus, for example, display multiplex signal A will go to a logic 0 when PAGE 1 = 1 and the ROM is at any ADDRESS other than ADDRESS 0, 1, 2 or 19.

Referring to FIG. 17, the $\overline{\phi_3}$ signal is applied to the input of an inverter gate 766. Thus when $\overline{\phi_3}$ goes to a logic 0, transistor 768 which is gated by gate 766 will be rendered conductive, supplying an oscillating signal to the TOUCH PAD DRIVER circuit 56.

Referring to FIG. 18, the BCD OUTPUT LATCHES are shown. The DATA BUSS lines 570, 572, 574 and 576 are applied to AND gates 770, 772, 774 and 776, respectively, along with the DPY $\phi_4$ signal. The purpose of the BTS signal (see FIG. 11) is to "precharge" all the DATA BUSS lines to a logic 1 as well as the RAM cells. This is accomplished by applying the BTS signal to the gate of transistors 778, 780, 782 and 784, which connect the DATA BUSS lines to a logic 1 ($V_{DD}$). Thus, the DATA BUSS is precharged to a logic 1 when $\phi_2 = 1$ or when RAM PRESET = 1. The output of AND gates 770–776 indicates the condition of the DATA BUSS. The output of each AND gate 770–776 is applied to the S. input of a respective latch, indicated by reference numeral 786, 788, 790 and 792 which are reset when the DPY. $\phi_3$ signal goes to a logic 1. The Q output of each latch 786–792 is applied to the gate of two transistors indicated by reference numerals 794 and 796, 798 and 800, 802 and 804, and 806 and 808, respectively. The output of transistors 796, 800, 804 and 808 is connected to a conventional seven segment BCD decoder 64. The output of transistors 794, 798, 802 and 806 is applied to an inverter 808, the output of which is applied to the gate of a transistor 810. Transistor 810 is located in series with transistor 812 which is gated by the DPY. $\phi_4$ signal. Thus, it can be seen that line 814 will be pulled to ground, when one or more of transistors 794, 798, 802 and 806 are rendered conductive, indicating that at least one of the DATA BUSS lines is at logic 1. The signal on line 814 is applied to the gate of transistor 816, the output of which is labeled BLANK. The purpose of the BLANK line is to blank out leading zeros on the display, and is conventional in the display art. Therefore, it should suffice to say that the BLANK signal will be a logic 0 when the BCD number stored in latches 786, 788, 790, and 792 is 0000 and the BLANK signal will be a logic 1 when the BCD number in latches 786–792 is anything other than 0000. Line 814 is also applied to the gate of transistor 816, the input of which is connected to the $\phi_1$ signal and the output of which is connected to the $S_2$ input of each of latches 786, 788, 790 and 792. Thus, when line 814 goes to a logic 1 indicating that the BCD number stored in latches 786–792 is 0000, transistor 816 will apply a logic 1 to the S. inputs when $\phi_1$ goes to a logic 1, thus setting the Q output of each latch 786–792 to a logic 1.

Operation of the System

In operation, when it is desired to operate a microwave oven with a control system of the present invention, the user first places the article to be heated in the oven cavity and latches the door closed. The most significant digit of the amount of time (in minutes and seconds) is entered first by touching the area on the touch plate representing that digit. The remaining digits of the amount of time are then successively entered by the user. After the proper amount of time has been entered into the control system, if the user desires that the oven be operated in the COOK mode, the start switch 16 is depressed and the magnetron will be energized for the entire amount of time which was originally entered by the user. If the user desires that the oven be operated in either SLOW COOK or the DEFROST modes or that the control system be operated in the TIMER mode, the appropriate touch switch is actuated after entering the amount of time into the system and then the START switch 16 is depressed. Accordingly, in the SLOW COOK mode, the magnetron is energized at a duty factor of 50% for the amount of time entered into the system by the user, and in the DEFROST mode, the magnetron is energized at a duty factor of 33% for the amount of time entered into the system by the user.

If a user desires that the oven be operated in one of the combination modes, such as the DEFROST-HOLD-COOK mode or the DEFROST-HOLD-SLOW COOK mode, the amount of defrost time is first entered into the system, and then the DEFROST touch switch is actuated. The user then selects a second amount of time, and actuates the SLOW COOK switch followed by the START switch to initiate the DEFROST-HOLD-SLOW COOK sequence or depresses the START switch after entering the second amount of time to initiate the DEFROST-HOLD-COOK sequence. Thus, in the DEFROST-HOLD-SLOW COOK sequence, the magnetron is energized at a duty factor of 33% for the first amount of time, is deenergized during the HOLD portion of the sequence for the second amount of time, and is energized at a duty factor of 50% for the second amount of time. In the same manner, during the DEFROST-HOLD-COOK, the magnetron is energized at a duty factor of 33% for the first amount of time, is deenergized during the HOLD portion of the sequence for the second amount of time, and is energized at a duty factor of 100% for the second amount of time for the COOK portion of the sequence.

If the control of the present invention is operating in the TIMER mode or any of the modes during which the magnetron is energized, the time remaining in that particular time interval is displayed. When information is being entered into the control, the system displays the entered information. At all other times however, the time of day is displayed by the system.

In order to set the time of day clock to the proper time, the CLOCK touch switch is first actuated and then the correct time (in hours and minutes) is entered. To store the correct time in the proper location, the CLOCK touch switch is again actuated, thus setting the time of day clock.

From the above detailed description, it can be seen that the present invention thus provides a digital logic control system for a microwave oven which is two stage programmable, and which thus provides a greater degree of flexibility than prior art controls. It has been found that the hold period between the DEFROST and the COOK or SLOW COOK portions of the combination modes allows the article which has been thawed, to reach a uniform temperature throughout so that it cooks evenly when the oven cycles into the COOK or SLOW COOK modes.

Those skilled in the art will appreciate that the invention and described above is merely exemplary of the preferred practice of the invention, and that modifications can be made without departing from the spirit and scope of the invention as defined in the apended claims.

What is claimed is:

1. A touch keyboard system for use with a digital logic control, which comprises:
   a touch plate comprised of a dielectric substrate having a plurality of pairs of serially connected capacitances formed thereon, each said pair of serially connected capacitances comprising a first electrically conductive coating on a first side of said substrate and second and third spaced apart electrically conductive coatings on the second side of said substrate coextensive with said first coating;
   an oscillating input signal applied to said third electrically conductive coatings;
   a semiconductor switch having input, output and control terminals for each pair of serially connected capacitances, the input terminal of each semiconductor switch being electrically connected to said second electrically conductive coating of each said pair of serially connected capacitances, the output terminals of said semiconductor switches being connected together;
   scanning means connected to the control terminals of said semiconductor switches for sequentially turning on said semiconductor switches;
   detecting circuit means connected to the output terminals of said semiconductor switches for detecting the absence of said oscillating input signal;
   said oscillating input signal normally being applied to said detecting circuit means through said serially connected capacitances and said semiconductor switches;
   said first electrically conductive coatings being user touchable to couple the body capacitance of the user to ground so that the level of said oscillating input at said detecting circuit means is substantially reduced when touched; and
   latch circuit means connected with said scanning circuit means and said detecting circuit means for storing a binary number therein which is indicative of the electrically conductive coating touched.

2. The touch keyboard system as claimed in claim 1, further comprising:
   A binary counter having a plurality of unique states;
   means for continuously cycling said binary counter through said plurality of unique states; and
   means connected with said detecting circuit means and said binary counter for generating a signal if a switch on said keyboard has been actuated for at least one cycle of the binary counter.

* * * * *